United States Patent
Limberger

(10) Patent No.: US 9,953,443 B2
(45) Date of Patent: Apr. 24, 2018

(54) INTERACTIVE, ADAPTIVE LEVEL-OF-DETAIL IN 2.5D TREEMAPS

(71) Applicant: Daniel Limberger, Potsdam (DE)

(72) Inventor: Daniel Limberger, Potsdam (DE)

(*) Notice: Subject to any disclaimer, the term of this patent is extended or adjusted under 35 U.S.C. 154(b) by 295 days.

(21) Appl. No.: 15/014,571

(22) Filed: Feb. 3, 2016

(65) Prior Publication Data
US 2017/0221238 A1    Aug. 3, 2017

(51) Int. Cl.
*G06T 11/20* (2006.01)
*G06T 15/00* (2011.01)
*G06T 1/20* (2006.01)

(52) U.S. Cl.
CPC .............. *G06T 11/206* (2013.01); *G06T 1/20* (2013.01); *G06T 15/005* (2013.01); *G06T 2210/52* (2013.01)

(58) Field of Classification Search
None
See application file for complete search history.

(56) References Cited

PUBLICATIONS

Blanch et al., "Browsing Zoomable Treemaps: Structure-Aware Multi-Scale Navigation Techniques", IEEE Transactions on Visualization and Computer Graphics, Nov./Dec. 2007, vol. 13, No. 6, 1248-1253.
Bohnet et al., "Monitoring Code Quality and Development Activity by Software Maps", MTD '11 Proceedings of the 2nd Workshop on Managing Technical Debt, 2011, 9-16.
Chuah, "Dynamic Aggregation with Circular Visual Designs", IEEE Symposium on Information Visualization, Oct. 19-20, 1998, 9 pages.
Dübel et al., "2D and 3D Presentation of Spatial Data: A Systematic Review", 3DVis (3DVis), 2014 IEEE VIS International Workshop, Nov. 2014, 11-18.
Elmqvist et al., "Hierarchical Aggregation for Information Visualization: Overview, Techniques and Design Guidelines", IEEE Transactions on Visualization and Computer Graphics, May 2010, vol. 16, Issue 3, 439-454.

(Continued)

*Primary Examiner* — Michelle Chin
(74) *Attorney, Agent, or Firm* — Baker & Hostetler LLP

(57) ABSTRACT

An aggregation approach allows for a dynamic, interactive, adaptive level-of-detail for 2D, 2.5D, and 3D treemaps for visualization of complex information. For example, the 2.5D treemap visualization concept is extended by providing adaptive identification of aggregates by means of an interactive node scoring approach based on contextual relevance and various other task, interaction, visibility, and/or performance specific criteria. For the resulting mapping and rendering, a per-frame aggregation of blocks and accumulation of those attributes mapped to visual variables (context) is described. Since every embodiment is also targeted for dynamic, interactive visual display of 2.5D treemaps, the rendering is designed to be capable for execution in real-time. Visual preservation of important information is conveyed by hierarchy elements and their mapped attributes (nodes-of-interest) as well as compliance to known aggregation guidelines including visualization of aggregated color and height information, visualization of aggregates that are discernible from non-aggregates, and visualization of outliers within aggregates. Applications include visualization of software maps, business intelligence data, file hierarchies for storage devices, and the like.

38 Claims, 15 Drawing Sheets

(56) References Cited

PUBLICATIONS

Fekete et al., "Interactive Information Visualization of a Million Items", IEEE Symposium on Information Visualization, Oct. 28-29, 2002, 9 pages.

Glander et al., "Abstract Representations for Interactive Visualization of Virtual 3D City Models", Computers, Environment and Urban Systems, Jul. 10, 2009, 32 pages.

Glander et al., "Automated Cell Based Generalization of Virtual 3D City Models with Dynamic Landmark Highlighting", Proceedings of the 11$^{th}$ ICA Workshop on Generalization and Multiple Representation, Jun. 2008, 14 pages.

Hahn et al., "Visualization of Varying Hierarchies by Stable Layout of Voronoi Treemaps", Information Visualization Theory and Applications (IVAPP), Jan. 5-8, 2014, 9 pages.

Limberger et al., "Interactive Software Maps for Web-Based Source Code Analysis", Hasso-Plattner-Institut, University of Potsdam, Germany, Jun. 20, 2013, 8 pages.

Munzner et al., "TreeJuxtaposer: Scalable Tree Comparison using Focus+Context with Guaranteed Visibility", ACM Transactions on Graphics (TOG)—Proceedings of ACM SIGGRAPH, Jul. 2003, vol. 22, Issue 3, 453-462.

Richter et al., "Out-of-core Visualization of Classified 3D Point Clouds", 3D Geoinformation Science, Nov. 2014, 227-242.

Rosenbaum et al., "Progressive Presentation of Large Hierarchies Using Treemaps", Advances in Visual Computing, 5$^{th}$ International Symposium, ISVC 2009, Nov. 30, 2009-Dec. 2, 2009, 71-80.

Schulz et al., "The Design Space of Implicit Hierarchy Visualization: A Survey", IEEE Transactions on Visualization and Computer Graphics, Apr. 17, 2011, 4, 393-411.

Semmo et al., "Cartography-Oriented Design of 3D Geospatial Information Visualization—Overview and Techniques", The Cartographic Journal, 2015, vol. 52, Issue 2, 20 pages.

Semmo et al., "Interactive Image Filtering for Level-of-Abstraction Texturing of Virtual 3D Scenes", Computers & Graphics, Nov. 2015, vol. 52, 181-198.

Shneiderman, "Treemaps for space-constrained visualization of hierarchies", http://www.cs.umd.edu/hcil/treemap-history/, Oct. 19, 2015, 18 pages.

Trapp et al., "Geometry Batching Using Texture-Arrays", Hasso-Plattner-Institut, Iniversity of Potsdam, Germany, Mar. 16, 2015, 8 pages.

Trapp et al., "Interactive Rendering and Stylization of Transportation Networks Using Distance Fields", Hasso-Plattner-Institut, Iniversity of Potsdam, Germany, Mar. 16, 2015, 12 pages.

Trapp et al., "3D Generalization Lenses for Interactive Focus + Context Visualization of Virtual City Models", IEEE, Jul. 2008, 6 pages.

Trapp et al., "Interactive Rendering of Complex 3D-Treemaps with a Comparative Performance Evaluation", Proceedings of the 8$^{th}$ International Conference on Computer Graphics Theory and Applications (GRAPP 2013), Jan. 2013, 11 pages.

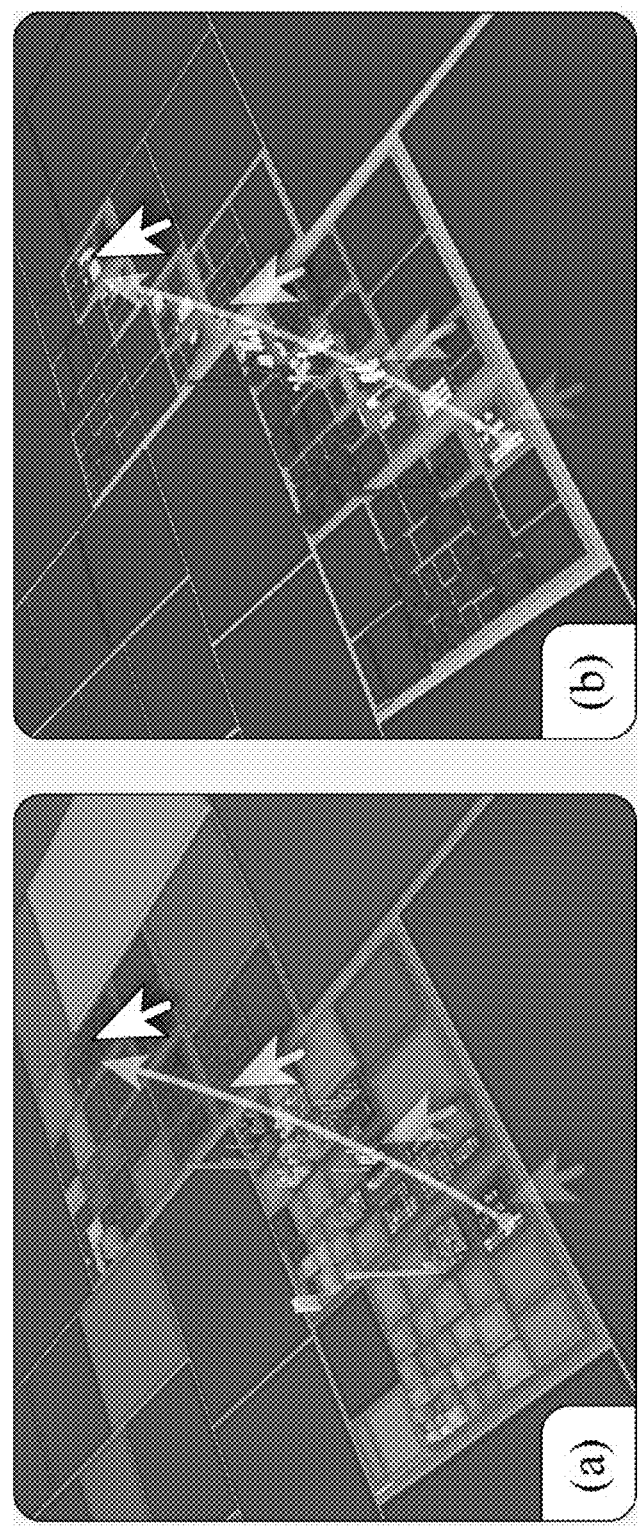

INTERACTIVE, ADAPTIVE LEVEL-OF-DETAIL IN 2.5D TREEMAPS

TECHNICAL FIELD

The invention described herein relates generally to processes and systems and related algorithms for providing improved information visualization on a display and, in particular, the processes and system and related algorithms for providing interactive and adaptive level-of-detail in 2.5D treemaps for presentation of non-spatial data using, for example, cartographic visualization techniques.

BACKGROUND

Interactive 2.5D treemaps serve as an effective tool for the visualization of attributed hierarchies, enabling exploration of non-spatial, multi-variate, hierarchical data. 2.5D treemaps derive a spatial reference from the data's hierarchy to create a reference geometry and to map the data attributes (depended variables) to visual variables of graphical elements (e.g., size, height, and color).

2D and 2.5D treemaps are applied in various research and industry applications to provide a comprehensive and consistent gestalt for communication and visual analytics of non-spatial, massive, evolving system information, e.g., file systems, software systems, business data, stock markets, gene ontology, or controller performance data. The image data is represented via (1) static images in reports or websites (digital as well as printouts) or (2) dynamic graphics on web platforms, mobile apps, as well as desktop software for interactive exploration. In both scenarios, the image data can be pre-computed, cached, computed on demand on-device/locally as well as via service-based provisioning.

Terminology

Visualization Pipeline

In information visualization, computer graphics systems are used to transform data into well-defined depictions (i.e., visual representations of data). These depictions allow for communication of massive, complex data using established metaphors, e.g., thematic maps. For such purposes, the fundamental concept of a visualization pipeline is implemented. As illustrated in FIG. 1, a visualization pipeline typically comprises four stages: (1) Data Analysis, (2) Filtering, (3) Mapping, and (4) Rendering. Raw data is analyzed and prepared for visualization purposes during data analysis. The resulting prepared data comprises variables of a reference space (e.g., entities and their relations) with multiple dependent/associated variables (attributes) of a multi-dimensional attribute space. A subset or subsets of the prepared data that is to be visualized (focus data) are specified by means of automated or user-centered filtering. These data are mapped to graphical elements, e.g., geometric primitives such as rectangles or cuboids (convex polyhedrons bounded by six quadrilateral faces), as well as to their visual variables color, texture, position, and size (i.e., extent and base for rectangles and an additional height for cuboids in the case of rectangular 2.5D treemaps). The resulting geometric data is finally transformed into image data during rendering.

FIG. 1 illustrates a data flow model of a generic visualization pipeline for visual display of tree-structured data. The typical as well as the preferred workload between the CPU and graphics processing unit (GPU) are displayed. One of the major bottlenecks for image synthesis is the junction between the CPU and GPU. In the typical environment, the CPU controls all data as well as the complete rendering process. With modern GPUs and architectures, the CPU dispatches most data once and only triggers a few draw calls, and the rendering process itself is mostly specified on the GPU. In a preferred workload, frames can be created with minimum CPU rendering dispatches required, thereby enabling the filtering, mapping, and rendering to be performed by the GPU, thereby enabling reduction in the required time for image synthesis.

Frame based Rendering/Within-Frame Rendering

For the visual display every single image computed via image synthesis (rendering) is called a frame. A frame hereby denotes the complete process of image synthesis which comprises at least the execution of the rendering stage, but usually the full processing of the filtering, mapping, and rendering stages. Even though all stages can be implemented and executed on CPUs, rendering is typically GPU-accelerated. Since state-of-the-art implementations and systems already execute mapping and filtering (sometimes even data analysis) on the GPU, the system and methods described herein are especially designed with limitations and constraints of such GPU-focused implementations in mind.

2D Treemap

Treemap denotes a visualization technique to depict tree-structured, non-spatial data (i.e., hierarchical structured elements, each having a single parent relation except for the root element, which has no parent) and related thematic information in a space-filling way. Hierarchy elements are mapped to graphical elements that are recursively stacked within their parents' elements (inclusion). The hierarchy elements exploit a number of cartographic visualization techniques, e.g., associated thematic information by means of (prepared) data can be mapped to visual variables (attribute mapping), where usually rectangular shapes are used with the visual variables shape-extent/area/size, color, texture, shading (e.g., cushion shading), etc. Since the original presentation of treemaps in 1991, a number of treemap layout variations have been published, improving readability, stability, and the graphical elements' aspect ratio.

2.5D Treemap

Various extensions to the 2D treemap approach exist. Extruding 2D treemap shapes allows for a 3D attribute space mapping to 3D substitutes within a treemap's two-dimensional reference space, hence, 2.5D. In contrast, a 3D treemap positions hierarchy elements within a three-dimensional reference space. Based on the Cityscape Metaphor, 2.5D treemaps take advantage of the third dimension for additional information display and typically use cuboids (and sometimes Voronoi cells) for visual representation of hierarchy elements. The equivalent designations "Code Cities" and "Software Maps" further indicate the underlying, cartographic paradigm.

2D, 2.5D, and 3D Treemaps

The invention described herein specializes on 2.5D treemaps. However, it is equally applicable to 2D and 3D treemaps in general. The differentiation is relevant, since 2.5D treemaps as well as 3D treemaps introduce a number of additional limitations due to higher complexity (representation for visual display, data mapping, interaction techniques by means of a user interface, system requirements, etc.). It is noted that the majority of the prior art and related work denotes 2.5D treemaps (as defined here) as 3D treemaps. In these cases, the invention is equally applicable since it is concerned with the exact same visualization approach (either 2D or 2.5D) that is used for exemplary embodiments of the invention. In the case of 'real' 3D treemaps, which use an additional degree of freedom for the spatialization of hierarchy nodes, e.g., placing cubes within cubes (instead of cubes into squares/top faces), the invention is applicable as well. However, in the case of 3D treemaps, the described add-on techniques (such as color accumulation as well as enriched aggregate and outlier display) might not have the same beneficial effect to the visualization as for 2D and 2.5D.

Mapping Theme

A deterministic, comprehensible, thematic mapping of tree-structured data to visual variables within a well-defined context is denoted herein as a mapping theme. For instance, for an exploration of correlation between development-activity and activity-relevance for a given software project, each source entity (e.g., class or source file) would be represented as a cuboid. A mapping theme then describes an underlying thematic mapping, e.g., the number of modifications within the last months mapped to color, the number of defects or "code smells" mapped to height, and some number of lines-of-code mapped to the cuboid's base.

Attribute Accumulation

To enable analysis or statements on the attributes of the root or any inner element (hierarchy element with at least one child), the attributes of all underlying leaf nodes have to be accumulated bottom-up. This attribute accumulation is usually executed during analysis or filtering and is required to be re-executed on every change in data (at least for the affected subset). For example, the size on disk of a hierarchical file system (root) is the sum of all individual file sizes (accumulation using sum). Those skilled in the art will appreciate that a broad range of accumulation operators and possibilities such as mean, average, minimum, maximum, etc. also may be used. Attribute accumulation is also required for derived attributes.

Discussion of Prior Art

With the extension of 2D treemaps to the third dimension, several challenges that apply for the depiction of massive data sets are introduced, such as increased rendering costs, occlusion of graphical elements, supplementing margins (especially important for the distinction of parents and auxiliary for reducing occlusion), and the need for effective navigation techniques. The visualization of large 2D treemaps with millions of items as presented by Fekete and Plaisant (FEKETE J.-D., PLAISANT C.: Interactive Information Visualization of a Million Items. In Proc. IEEE IV (2002), pp. 117-124) causes visual clutter that decreases the pre-attentive perception qualities of color and height as well as increases the cognitive load. Elmqvist and Fekete (ELMQVIST N., FEKETE J.-D.: Hierarchical Aggregation for Information Visualization: Overview, Techniques, and Design Guidelines. IEEE Trans. Vis. Comput. Graph. (2010), pp. 439-454) present a hierarchical aggregation concept for zoomable 2D treemaps using subdivided shapes for the abstracted depiction of inner nodes. They introduced the following guidelines for hierarchical aggregation describing the characteristic of the resulting depiction of aggregates from an observer's perspective: (G1) Entity budget states that a maximum of displayed entities should be maintained. (G2) Visual summary demands that aggregates should convey information about their underlying data. (G3) Visual simplicity requires aggregates to be clean and simple in their presentation. (G4) Discriminability requires a distinguishable presentation of aggregates and data items. (G5) Fidelity indicates that abstractions and thus, their resulting aggregates should not lie about their underlying data. (G6) Interpretability suggests aggregates to remain always correctly interpretable within the visual mapping.

There are three groups of abstraction in information visualization, also known as appearance, spatial, and temporal distortion. Appearance distortion constitutes the abstraction through aggregation since it comprises strategies changing the gestalt of nodes presentations, e.g., by the change of color, size, or opacity. Dynamic, hierarchical aggregation that is capable of real-time, per-frame aggregation poses a technical constraint to the methods and apparatus described herein, and was similarly applied to polar treemaps (CHUAH M. C.: Dynamic Aggregation with Circular Visual Designs. In Proc. IEEE InfoVis (1998), pp. 35-43) and the display of large hierarchies (MUNZNER T., GUIMBRETIÈRE F., TASIRAN S., ZHANG L., ZHOU Y.: TreeJuxtaposer: Scalable Tree Comparison Using Focus+Context with Guaranteed Visibility. ACM Trans. Graph. 22, 3 (2003), 453-462). The latter introduced guaranteed visibility of nodes-of-interest (for one-dimensional spatialization, i.e., icicle plot, preferably on very large displays). Relating to screen visibility, it is desirable that the invention can similarly optimize discriminability within the view. A recent approach for the interactive rendering of large 2.5D treemaps that combines attributed point clouds and GPU-based geometry instantiation (TRAPP M., SCHMECHEL S., DÖLLNER J.: Interactive Rendering of Complex 3D-Treemaps. In Proc. GRAPP (2013), pp. 165-175) introduces a data encoding that allows rendering of millions of individual items for massively reduced CPU workload but suffers from indistinguishable treemap items as well as Moiré effects due to perspective projection and high zoom levels.

For the presentation of important, but indiscernible small areas and partial aggregation, the present inventors have exploited an idea on cartographic generalization of virtual 3D city models: the generalization into different level-of-detail (LoD) by aggregating building models to cell blocks and subtraction of free space for points-of-interests (i.e., landmarks) (TRAPP M., GLANDER T., BUCHHOLZ H., DÖLLNER J.: 3D Generalization Lenses for Interactive Focus+Context Visualization of Virtual City Models. In Proc. IEEE IV (2008), pp. 356-361). This approach, however, does not allow for strict dynamic aggregation (by design) since it requires computation intensive pre-processing and is focusing on geospatial data only, which, in contrast to abstract tree-structured data, has a natural gestalt. Also, this computation intensive approach is quite slow and optimization is difficult since the geometry is quite complex. A progressive refinement approach for 2D treemaps (ROSENBAUM R., HAMANN B.: Progressive Presentation of Large Hierarchies Using Treemaps. In Proc. ISVC (2009), pp. 71-80) considers system resources and allows for better conveyance of topological features and attributes. Though different in technical approach, the invention described herein is designed to allow progressive refinement and to consider system resources similarly. For identification and exploration of areas-of-interest through user navigation, the hierarchical structure of treemaps can be used as basis for zooming stages (BLANCH R., LECOLINET E.: Browsing Zoomable Treemaps: Structure-Aware Multi-Scale Navigation Techniques. IEEE Trans. Vis. Comput. Graph. 13, 6 (2007), 1248-1253) that can be combined with the generalization approach described herein. The prior art, however, does not consider automated or adaptive level-of-detail control and is, as presented, limited to planar treemaps.

Bohnet and Döllner (BOHNET J., DÖLLNER J.: Monitoring Code Quality and Development Activity by Software Maps. In Proc. ACM MTD (Workshop on Managing Technical Debt), 2011, 9-16) describe how 2.5D treemaps can be used to facilitate project management, especially for feature implementation versus resulting code quality of software projects with respect to the systems maintainability and future hidden cost. 2.5D treemaps, denoted as Software Maps, are introduced to make code quality visible to "stakeholders in the development process, particularly, to the management" by means of visualization of automated software analysis, metrics, and activity data. For example, they (2.5D treemaps) facilitate to decide where in the code an increase of quality would be beneficial both for speeding up current development activities and for reducing risks of future maintenance problems.

It is desired to extend the teachings of the prior art, particularly the teachings of Bohnet and Döllner to provide interactive and adaptive level-of-detail 2.5D treemaps for presentation of spatial data using, for example, cartographic visualization techniques. The invention described herein addresses these and other needs in the art.

SUMMARY

When depicting massive quantities of hierarchy elements (nodes) using treemaps, the common 1:1 mapping of nodes to blocks leads to the following mutually influential limitations: (1) high cognitive load for the user due to visual clutter; (2) insufficient visual representation of hierarchy elements and contextual information; and (3) decrease in rendering performance and responsiveness (provisioning and interactivity) due to an increasing scene complexity. This induces additional need for exploration (i.e., navigation and interaction) and changes in the user's locus of attention. Furthermore, interactive exploration of massive data involves continuous feedback to the applied filtering and mapping, thus requiring a 2.5D treemap that is able to adapt and respond in real-time. For common tasks, e.g., depicting changes within a given time span or showing filtering results or outliers, usually only a small set of nodes is affected by the actual attribute mapping (focus). An equally complex geometry for remaining treemap areas (context) can be distracting and hindering in such tasks. At worst, it facilitates unintentional, misguided and wrong decision making due to unsighted information. Within the context of software engineering, for example, this can easily cause financial as well as structural damage to a company as well as its contractors and subcontractors/partners (e.g., due to missing defect prevention, improper architecture changes, or third party acquisitions).

The invention addresses these limitations by providing an aggregation approach that allows for a dynamic, interactive, adaptive level-of-detail for 2.5D treemaps. The methods and apparatus discussed extend the 2.5D treemap in at least the following ways:

Adaptive identification of aggregates (aggregation) by means of an automatic and interactive node scoring approach based on contextual relevance and various other criteria, e.g., task, interaction, visibility, software budget, the number of items on the display, or performance specific criteria. For the resulting mapping and rendering, a per-frame aggregation of blocks and accumulation of those attributes mapped to visual variables (context) is described. Since every embodiment is also targeted for dynamic, interactive visual display of 2.5D treemaps, the rendering is designed to be capable for execution in real-time, i.e., providing a continuous stream of multiple frames per second (e.g., 15 and above).

Visual preservation of important information (focus) conveyed by hierarchy elements and their mapped attributes (nodes-of-interest)—in contrast not-mapped-attributes would be node data that are available for mapping to visual variables but are not used for the applied map theme-as well as compliance to the aggregation guidelines G1 to G6 (entity budget, visual summary, visual simplicity, discriminability, fidelity, and interpretability, as discussed in the prior art). This comprises:

Visualization of aggregated color and height information,

Visualization of aggregates that are discernible from non-aggregates, and

Visualization of outliers within aggregates.

Temporal transitions between aggregation states for handling abrupt state changes featuring node-local durations that can be linked to, e.g., the nodes' relevance/importance or the aggregation cause in terms of arbitrary subsets of scores used by the automated scoring. This enables automated transition control (transition semantic) ranging from explicit, noticeable/fast transitions to distraction free, unobtrusive/slow transitions.

The aggregation approach described herein basically operates as follows. For an input set of important attributes, i.e., as a filtering result, the set of associated nodes is retrieved and used as baseline for bottom-up aggregation of all remaining nodes. For aggregated nodes, mapped attributes are accumulated resulting in aggregated cuboids with additional visual fidelity that allows preservation of important attributes while drastically reducing the treemap's geometric complexity.

Furthermore, the aggregation approach described herein enables the system to respond to user needs and interactions in real-time, to satisfy aggregation guidelines for hierarchical aggregation introduced by Elmqvist and Fekete, to reduce visual clutter of the visual display, and to allow for GPU-focused implementation. Most importantly, the invention facilitates efficient identification of areas-of-interest and increases processing efficiencies. For example, in addition to improving area-of-interest identification, the invention reduces cognitive load while maintaining most/all information and thus facilitates effective communication of important attributes by guiding a user's focus of attention.

In exemplary embodiments, interactive, adaptive aggregation in 2.5D treemaps facilitates informed decision making and optimizes, inter alia, the communication of quality aspects, development activity, as well as budget and resource planning for large software system projects.

The generalization approach described herein, though focusing on rectangular-based 2.5D treemaps, is applicable to treemaps that are based on inclusion. This comprises 2D, 2.5D, and 3D treemaps. The work of Schulz, Hadlak, and Schumann (SCHULZ H.-J., HADLAK S., SCHUMANN H.: The Design Space of Implicit Hierarchy Visualization: A Survey. IEEE Trans. Vis. Comput. Graph. 17, 4 (2011), pp. 393-411) enlists most existing treemap approaches and allows simple identification of visualization techniques that use inclusion and are 2D/3D as shown in Table 1 of Schulz et al. Most of the scores suggested herein, however, are developed mainly for rectangular 2D and 2.5D treemaps.

There might be other, more special, scores for non-rectangular treemaps or 3D treemaps that are not discussed herein but can be accounted for. These and other characteristics of the invention will be apparent from the following detailed description.

BRIEF DESCRIPTION OF THE DRAWINGS

The invention is described herein with respect to numerous figures, of which:

FIG. 2a illustrates a visualization of the complete hierarchy that is affected by visual clutter and FIG. 2b illustrates a generalized version using the invention reduces overall visual complexity while preserving important information, such as nodes-of-interest and data outliers.

FIG. 10a and FIG. 10b illustrate an example for a focus driven, dynamic LoD based user-focus scoring, i.e., mouse over where FIG. 10a depicts nodes-of-interest as well as areas of recent user interaction that are non-aggregated, leaving all remaining nodes aggregated; and FIG. 10b depicts the used focus density map created by the user's cursor movement.

FIG. 11a illustrates no enhancement, aggregates cannot be distinguished from leaf nodes, FIG. 11b illustrates top face contouring and FIG. 11c illustrates top face truncation towards the center, both correlating to the aggregated node's padding.

FIG. 12d illustrates the rendering of nodes-of-interest within aggregates.

FIG. 13a, FIG. 13b and FIG. 13c depict decreasing levels-of-detail for an area of a treemap (without discriminability enhancement as depicted in FIG. 11a, FIG. 11b and FIG. 11c).

DETAILED DESCRIPTION OF ILLUSTRATIVE EMBODIMENTS

Specific details are set forth in the following description with respect to FIGS. 2-15 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Aggregation as a technique to reduce complexity is important for applications that follow the visual information-seeking mantra ("Overview first, zoom and filter, then details-on demand"). To overcome the inherent scalability problems for the visual display of large hierarchical data sets via treemaps and to facilitate the user's comprehension, aggregation is performed in exemplary embodiments both in the attribute space as well as in the presentation space. This way, the treemap "becomes a multiscale structure, and can be controlled by using generic interaction techniques for multiscale navigation" (ELMQVIST N., FEKETE J.-D.: Hierarchical Aggregation for Information Visualization: Overview, Techniques, and Design Guidelines. IEEE Trans. Vis. Comput. Graph. (2010), pp. 439-454). It is a frequently used type of data abstraction "reducing a large dataset into one of moderate size, while maintaining dominant characteristics of the original dataset" as described by Cui et al. (CUI Q., WARD M., RUNDENSTEINER E., and YANG J.: Measuring Data Abstraction Quality in Multiresolution Visualization. IEEE Trans. Vis. Comput. Graph. (2006), pp. 709-716), and, in exemplary embodiments, these characteristics are particularly taken care of by visually preserving the important data, i.e., nodes-of-interest.

Figure 1:
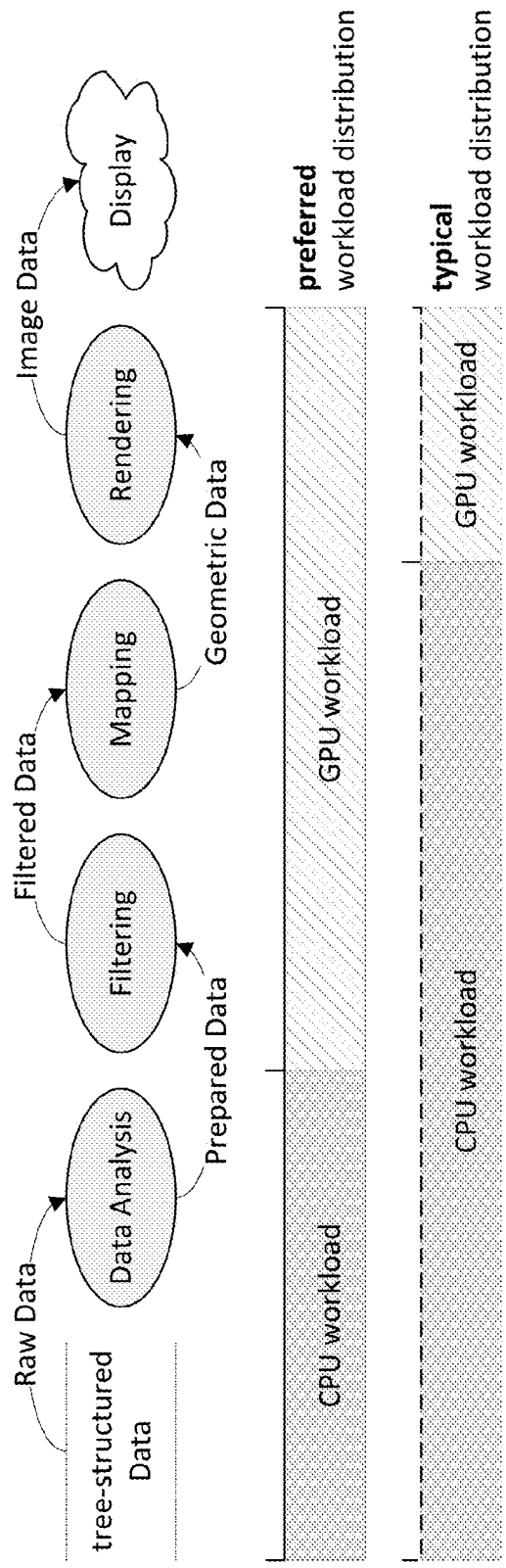
FIG. 1 illustrates a data flow model of a generic visualization pipeline for visual display of tree-structured data.
Figures 2A, 2B:
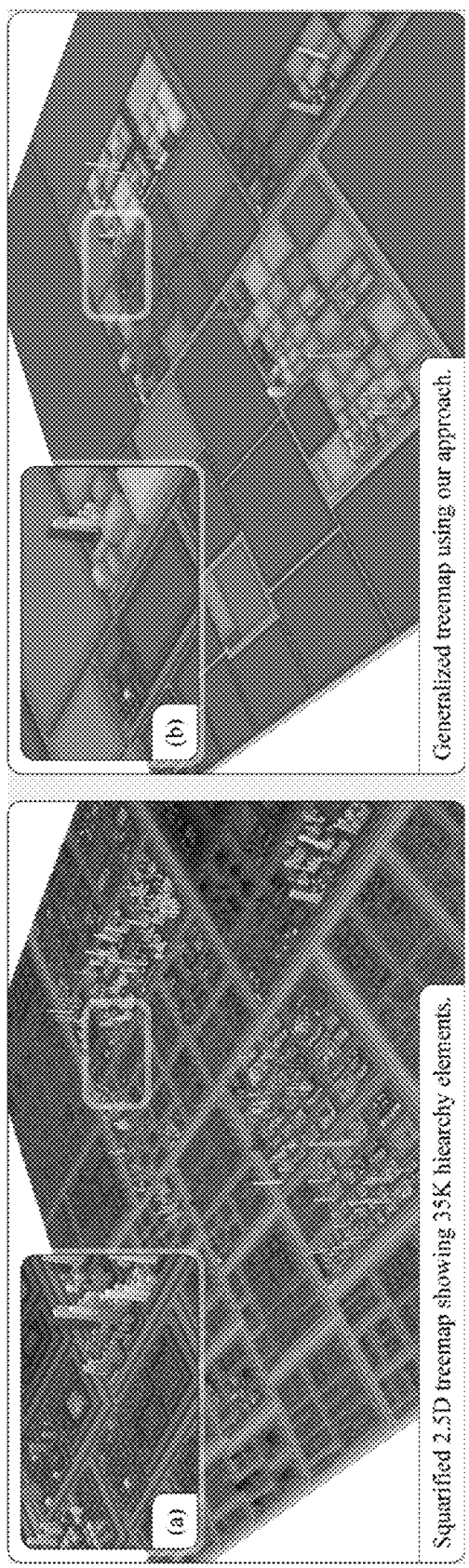
FIG. 2a and FIG. 2b illustrate a squarified 2.5D treemap depicting a complex hierarchy where
Figure 3:
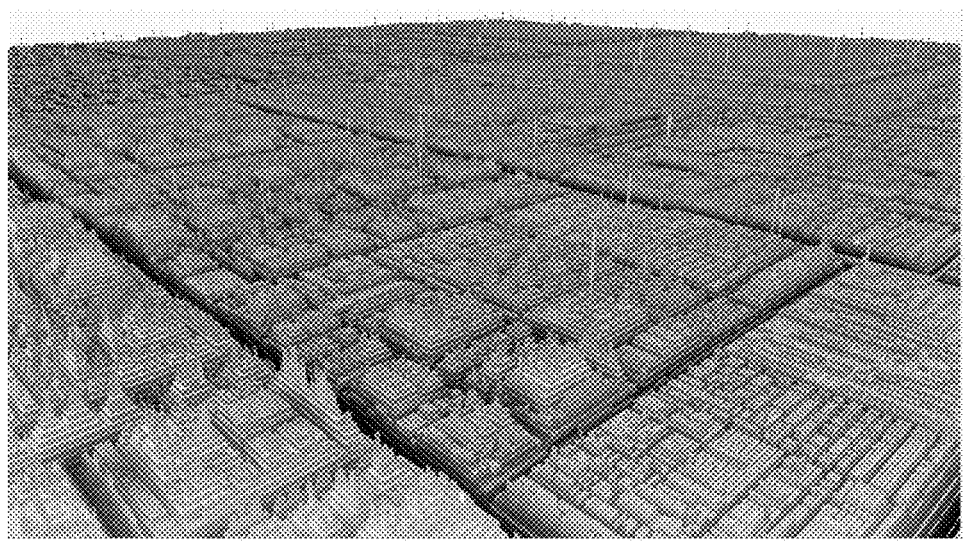
FIG. 3 shows an example that highlights the amount of visual clutter introduced by typical, larger data sets.

By way of example, FIG. 2 illustrates a squarified 2.5D treemap depicting a hierarchy. In FIG. 2(a), a visualization of the complete tree is shown that is affected by visual clutter. In FIG. 2(b), a generalized version using the inventive techniques described herein reduces overall visual complexity while preserving important information. The insets (a) and (b) compare associated focus and context regions. For industry applications, however, much larger data sets of hundreds of thousand nodes are typically visualized, resulting in an even higher amount of visual clutter as shown in FIG. 3. The example of FIG. 3 highlights the amount of visual clutter introduced by typical, larger data sets. In this example, an industry application of about 800,000 entities/ nodes was visualized. It simply cannot be explored by nor be used for any real life application without applying aggregation.

Similar to generalization approaches for 3D spatial (especially geo-spatial) environments, a set of child nodes of an inner node is generalized as a single graphical element, the so-called "visual aggregate" (aggregate). With respect to the applied map theme, the aggregate extends the inner node's block by the visual variables used, summarizing the mapped attributes of its children appropriately. By retaining the inner node's base, the independent reference variable and the attribute mapped to footprint are inherently aggregated. A layout re-computation is not required and simultaneously, an unambiguous and self-consistent summary of all contained bases (padding/margin included) is provided to the user. From the perspective of visualization, the inner node then becomes, essentially a leaf node and is represented as such. This already satisfies the guidelines for visual summary (G2), visual simplicity (G3), and interpretability (G6) with respect to the visual variables footprint and height.

Referring again to the information seeking mantra, the invention ultimately transforms it to a simple, use-case aware, 'single-observation-mantra,' reducing the exploration overhead for the user in terms of interaction by zoom, filter, and detail navigation in most cases to zero or a minimum. Additional exploration and navigation is of course supported as usual, without any restrictions, and can be enhanced as well using the scoring approach described herein.

Figure 4:
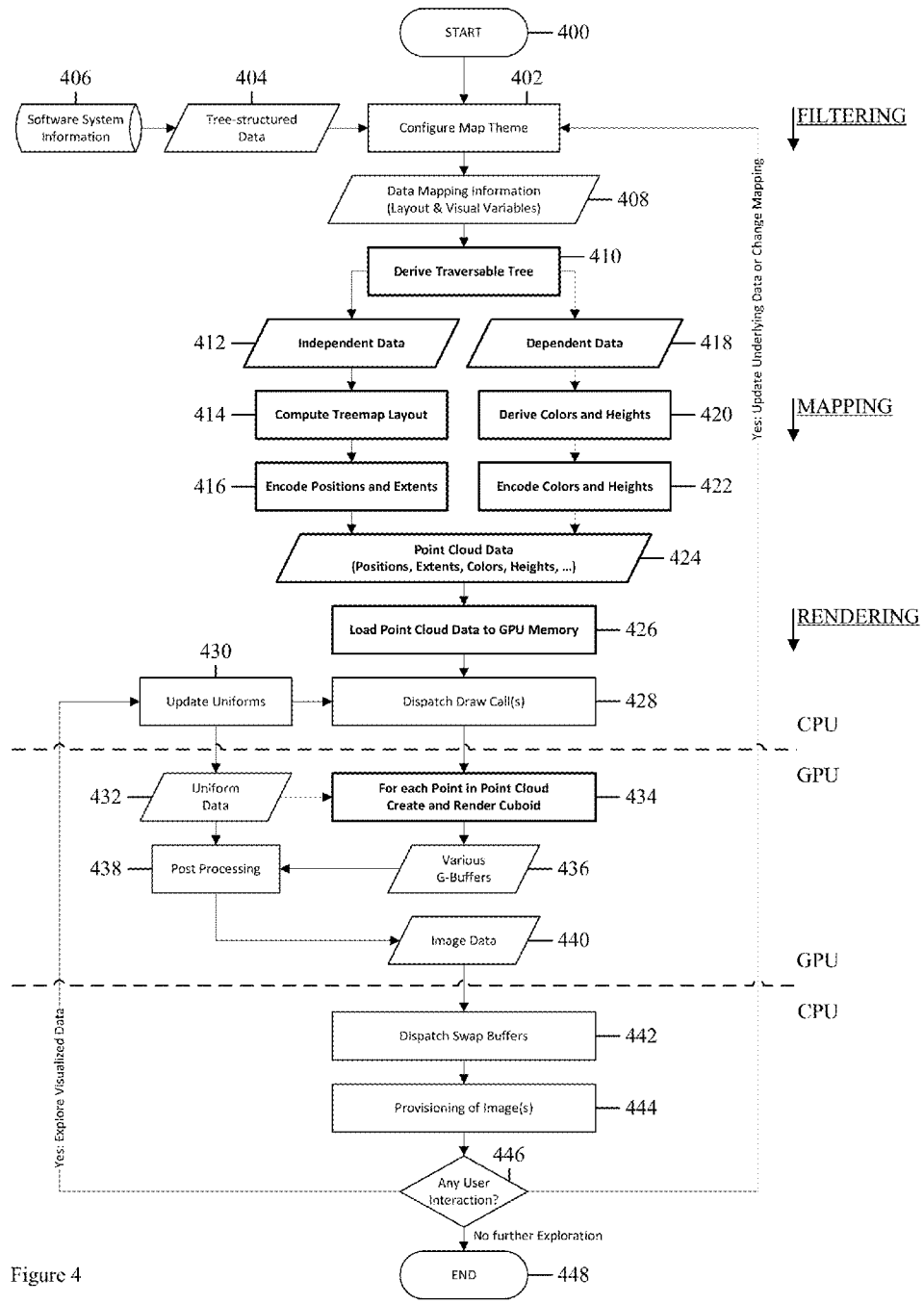
FIG. 4 illustrates an advanced algorithm for rendering large 2.5D Treemaps empowering the GPU by using geometry instantiation.
Figure 8:
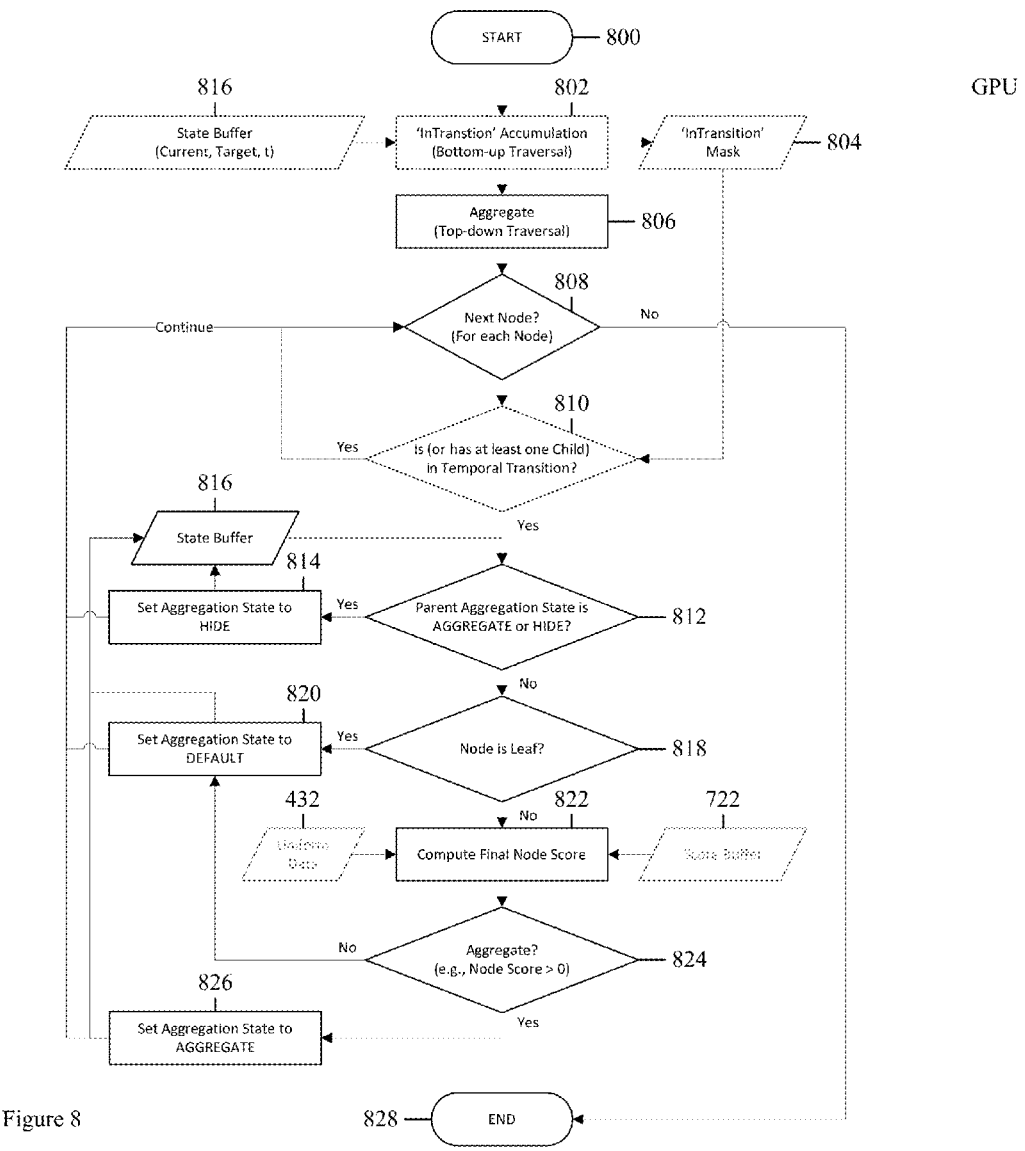
FIG. 8 illustrates that, based on the scoring data, for every node (top-down) an aggregate state is derived in the aggregation pass, e.g., by evaluating the final, ad-hoc/in-place derived node-score that is passed to the subsequent pass.

As noted above, exemplary embodiments of the invention focus on 2.5D treemaps. However, the techniques described herein are equally applicable to 2D and 3D treemaps in general. The aggregation techniques of the invention improve the efficiency of presentation and effectiveness of communication of large and massive, tree-structured data, such as software system and process information or business intelligence data. A recent approach for the interactive rendering of large 2.5D treemaps that combines attributed point clouds and GPU-based geometry instantiation (TRAPP M., SCHMECHEL S., DÖLLNER J.: Interactive Rendering of Complex 3D-Treemaps. In Proc. GRAPP (2013)) enables real-time rendering and per-frame aggregation control. Trapp et al. provide the basis for per-frame and per-node evaluation of attributes and scores for aggregation control for the invention. The state of the art algorithm for GPU-accelerated drawing of treemaps so far is depicted in FIG. 4. The methods of the invention extend this design to reduce CPU-GPU communication and to support partial pipeline evaluation (overview depicted in FIG. 5), i.e., implemented in the mapping and rendering stages preferably executed on the GPU (FIG. 8). This reduces provisioning overhead of visual displays in terms of reduced image synthesis complexity and response time, especially important in service based applications. At the same time, the disclosed aggregation methods can be implemented with reduced rendering capabilities, memory footprint, and throughput, thereby increasing the applicability for client-side/on-device image synthesis, e.g., local provisioning via websites or mobile devices.

FIG. 4 illustrates an advanced algorithm for rendering large 2.5D Treemaps empowering the GPU by using geometry instantiation as discussed in the prior art by Trapp et al., for example. The visualization process is mostly controlled on the CPU side, with the GPU only benefiting from the enhanced rendering data (point cloud data) by means of efficiently dispatched draw calls and traversals of the tree-structured data. However, the spatialization and mapping of attributes to visual variables (mapping stage) is executed on the CPU, resulting in a point cloud explicitly comprising rendering data, not attribute data. Any non-trivial manipulation towards the visual display requires full re-mapping. Dynamic, non-trivial, GPU-side visualization modifications (i.e., scoring, aggregation) are not possible by this algorithm. Processes of bold outline depict processes that are affected most or are fully renewed/replaced by the method of the invention.

The process depicted in FIG. 4 can of course be done without geometry instantiation, requiring the CPU to generate the cuboids and additional shape and shading information and transfer it to GPU. For the for loop (iterating over all points of the point cloud) an arbitrary (even random) tree traversal can be used, which is good, since every single node (parent or leaf) can be processed independently and, thus, in parallel. However, the approach used in FIG. 4 increases the memory footprint on both the CPU and GPU especially, and requires additional CPU-GPU communication, e.g., when color schemes or height scaling (minor mapping configuration) changes. Note that the diagram depicts no scoring or aggregation concept whatsoever and that color and height attributes are stored per-node only for leaf nodes. Inner nodes (parents) can access single uniform color and height (or similarly simple mapping, e.g., based on the nodes nesting level). For an optimal and flexible implementation of the inventive methods, the processes/data boxes emphasized by bold outline and font represent the main steps to be redesigned and replaced.

As shown in FIG. 4, the algorithm for hardware-accelerated rendering of large 2.5D Treemaps in a CPU starts at 400 by enabling the user to configure a map theme for filtering the data via a user interface at 402 using underlying information relating to the system being mapped. For example, in the context of using treemaps to model a software system, tree-structured data 404 representing software system information 406 is provided to the software system for configuration into the map theme specified by the user at step 402. The layout and visual variables data 408 is then mapped at steps 410 to 422 to provide a layout and visual variables consistent with the map theme specified at step 402. The algorithm derives a traversable tree at 410 that includes independent data (412) from which a treemap layout is computed at 414 and from which positions and extents of the data are computed and encoded at 416. The traversable tree also includes dependent data (418) on the leaves of the traversable tree from which colors and heights are derived at 420 and colors and heights are encoded at 422. The tree layout, colors and heights, and encoded data are aggregated into a point cloud at 424 and loaded into the memory of a GPU at 426 for generation of the treemaps to be displayed to the user. The CPU dispatches a single (or at least only a few) draw call for all points per frame to the GPU for drawing the data on a display at 428 in response to update information (e.g., virtual camera, color scheme, height scale, etc.) provided by way of feedback at 430. This feedback loop is displayed in a more general way, since it depicts the typical use of the Uniform/Uniform Buffer concept supported in most Graphics APIs. Thereby, lots of minor variables are set by the CPU and read by the GPU without noticeable performance impact. The Uniform Data (432) is highly implementation specific and can be structured as required. The GPU then starts the rendering process at 434 whereby for each point in the point cloud the GPU creates and renders a cuboid that is buffered at 436 and post-processed at 438 to generate image data 440. The GPU swaps buffers at 442 (which is an optional step used to indicate the end of a single frame), provisions the image at 444 in any reasonable way (highly use-case and application specific) and waits for the next dispatch/frame of data to be processed. If a change in user interaction related scores (e.g., through navigation, selection, mouse hover, etc.), the underlying data, or minor changes by means of uniform data is not detected at 446, provisioning of the image ends at 448. However, if interaction is detected at 446, the visualized data is explored by feeding information back to 430 for rendering. If the mapping or the underlying data is updated/adjusted, in order to change the mapping as appropriate, the data is fed back to 402 for reconfiguring, refiltering, remapping, and rerendering.

For GPU-focused implementation, the GPU data is prepared and structured in a special way. Instead of an arbitrary tree data representation with nodes and various attributes referenced per node, a linearized tree for every independent and dependent variable (basically for every attribute) as well as for positions and extents resulting from treemap layouting is generated. Those skilled in the art will appreciate that there is no linearized treemap but that there is linearized tree data. Linearization is the processes of making memory align in a well-defined, linear sequence. The resulting memory can be denoted as linearized tree data in general, or more specifically, as linearized geometry, linearized attributes, linearized positions, etc. For the traversal, an additional tree topology buffer is required for navigating the nodes in a well-defined way, e.g., top-down or bottom-up traversal. This buffer provides at least indices for each node, its parent, as well as its first child. Furthermore, the linearization is optimized for tree traversal per hierarchy level, by sorting inner nodes with same hierarchy level into the same buckets. This allows for parallel traversal on massive SIMD (single instruction multiple data) processing hardware such as GPUs, for example. All leaf nodes, however, are stored in a single bucket regardless of their hierarchy level. This allows fast passes on inner nodes, and maximizes parallel processing for passes on leaf nodes.

Figure 5:
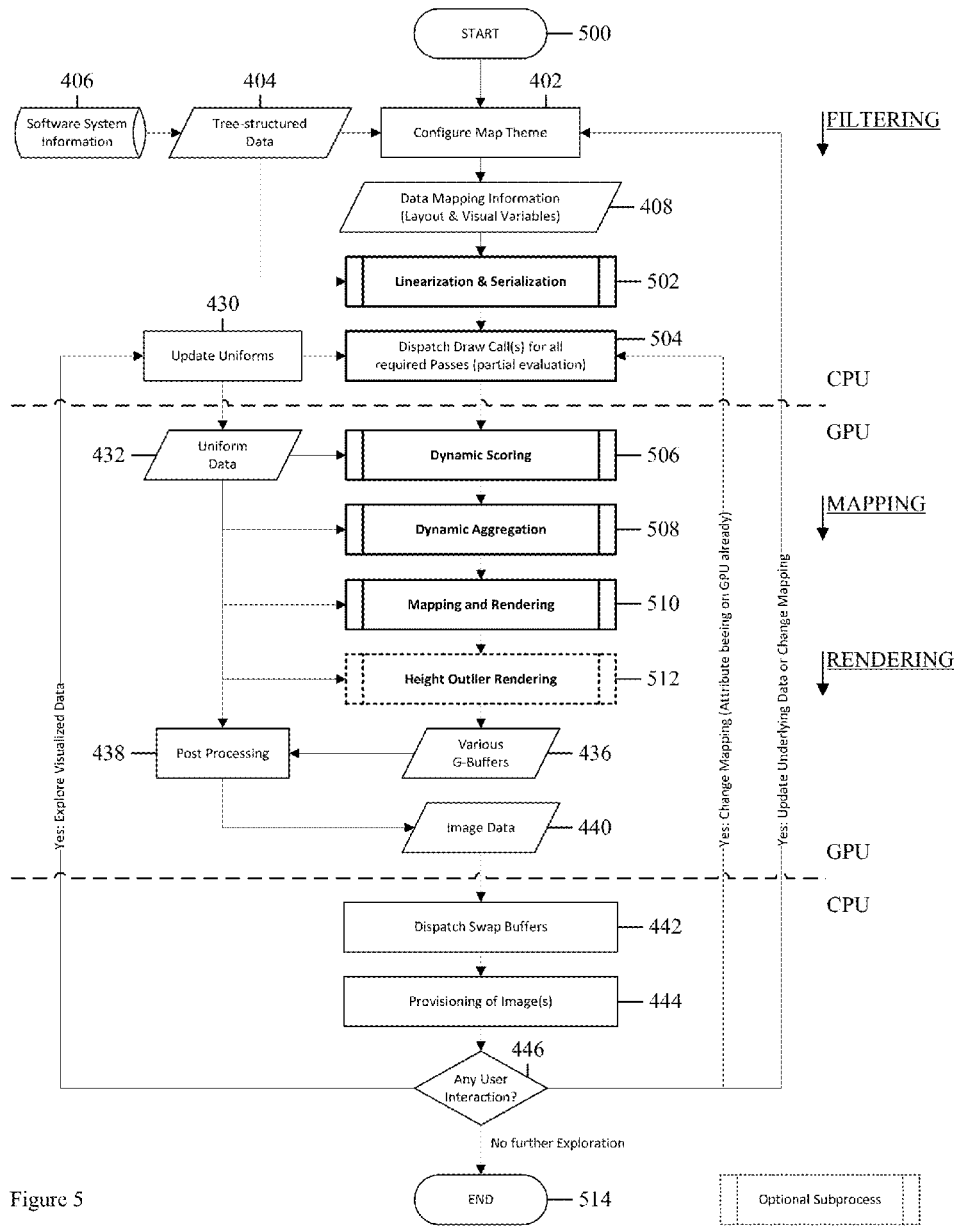
FIG. 5 illustrates a simplified data flow for the conceptual stages (depicted as sub processes) of the method of the invention within the visualization pipeline where the stages comprise linearization and serialization, scoring, aggregation, temporal transitions, as well as mapping and rendering.

FIG. 5 illustrates an overview of the mapping stage as proposed in exemplary embodiments. Processes and data deviating from the 'default' mapping stage (FIG. 4) are emphasized using a bold outline and associate to subprocesses further detailed in FIGS. 6 to 9 as well as the visual preservation of height outliers in FIG. 12. Note that the inventors do not limit the attribute buffers to position, extent, height, and color (the obvious visual variables), but instead facilitate the use of additional attribute buffers, that can be accessed on demand by GPU processes. This is especially useful, e.g., if scoring is considering other attributes/data, in addition to the attributes mapped to visual variables.

As shown in FIG. 5, the mapping stage for GPU-focused 2.5D treemaps with aggregation starts at 500 and derives a linearized tree (optimized for parallelism) starting at 502 after being pre-processed in the filtering stage as described above with respect to FIG. 4. The CPU dispatches multiple draw calls per frame, one for every pass required, at 504. As in FIG. 4, the CPU dispatches a single (or at least only a few) draw call for all points per frame to the GPU for drawing the data on a display at 504 in response to update information (e.g., virtual camera, color scheme, height scale, etc.) provided by way of feedback at 430. The process of FIG. 5 then provides dynamic scoring at step 506, dynamic aggregation at step 508, mapping and rendering at step 510 and (optionally) height outlier rendering at step 512, as will be described in more detail below. As in the FIG. 4 embodiment, Uniform Data (432) is fed back that is highly implementation specific and can be structured as required. Steps 436-446 proceed as described above with respect to FIG. 4 until the process ends at step 514.

With this, on the GPU (as well as on the CPU), the exact kind of traversal freedom required for the scoring, adaptive aggregation, and rendering methods are available. For example, accumulating or scoring starts on leaf bucket, then continues up until the root bucket (single node) is reached.

Figure 6:
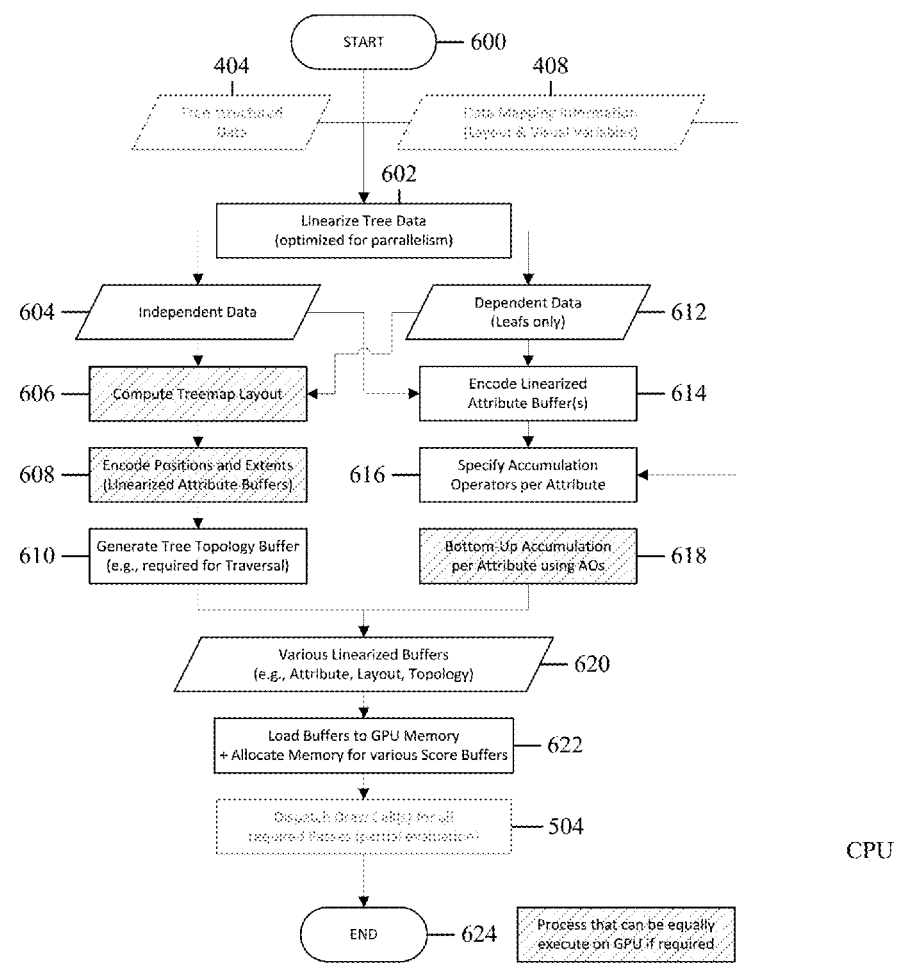
FIG. 6 illustrates the linearization and serialization algorithm where various processes can be implemented for the GPU instead, and, if so, should be executed right after the draw call dispatch.

FIG. 6 illustrates the sub process 502 of FIG. 5 in more detail. FIG. 6 illustrates the linearization and serialization algorithm where various processes can be implemented for the GPU instead, and, if so, should be executed right after the draw call dispatch at step 504. However, even if these are executed only on input data changes, the benefits are usually marginal in terms of execution speed, interactivity, and provisioning whereas memory use and implementation complexity increase.

The process starts at step 600 and, in a first step 602, the tree-structured data is linearized and optimized for massive parallel processing. As in the embodiment of FIG. 4, the independent data and dependent data are processed separately. The independent data (604) in combination with at least one attribute is used to compute a treemap layout at 606 and positions and extents of the data are computed and stored in linearized attribute buffers at 608. For the traversal, an additional tree topology buffer is generated in 610 for navigating the nodes in a well-defined way, e.g., top-down or bottom-up as traversal as well as arbitrary parallel processing. This buffer provides at least indices for each node, its parent, as well as its first child. The dependent data (612) on the leaves of the traversable tree is encoded at 614 and stored in linearized attribute buffers. The accumulation operators per attribute or attribute group are specified at 616. The accumulation operators are then used at 618 for bottom-up accumulation per attribute (e.g., resulting in attributes for parents). It is noted that in contrast to FIG. 4, no mapping of attributes to visual variables except the layouting (if executed on CPU) is required. The treemap layout, and accumulated attributes for later mapping are collected in attribute buffers at 620 and loaded to GPU memory at 622. Additional GPU memory is allocated for subsequent processing such as scoring as will be explained below with respect to FIG. 7. The processes 606, 608, and 618 can be similarly implemented on the GPU, if preferred, e.g., to reduce CPU/GPU communication overhead while providing more flexibility on layouting (this conceptually moves mapping stage fully to the GPU).

Figure 7:
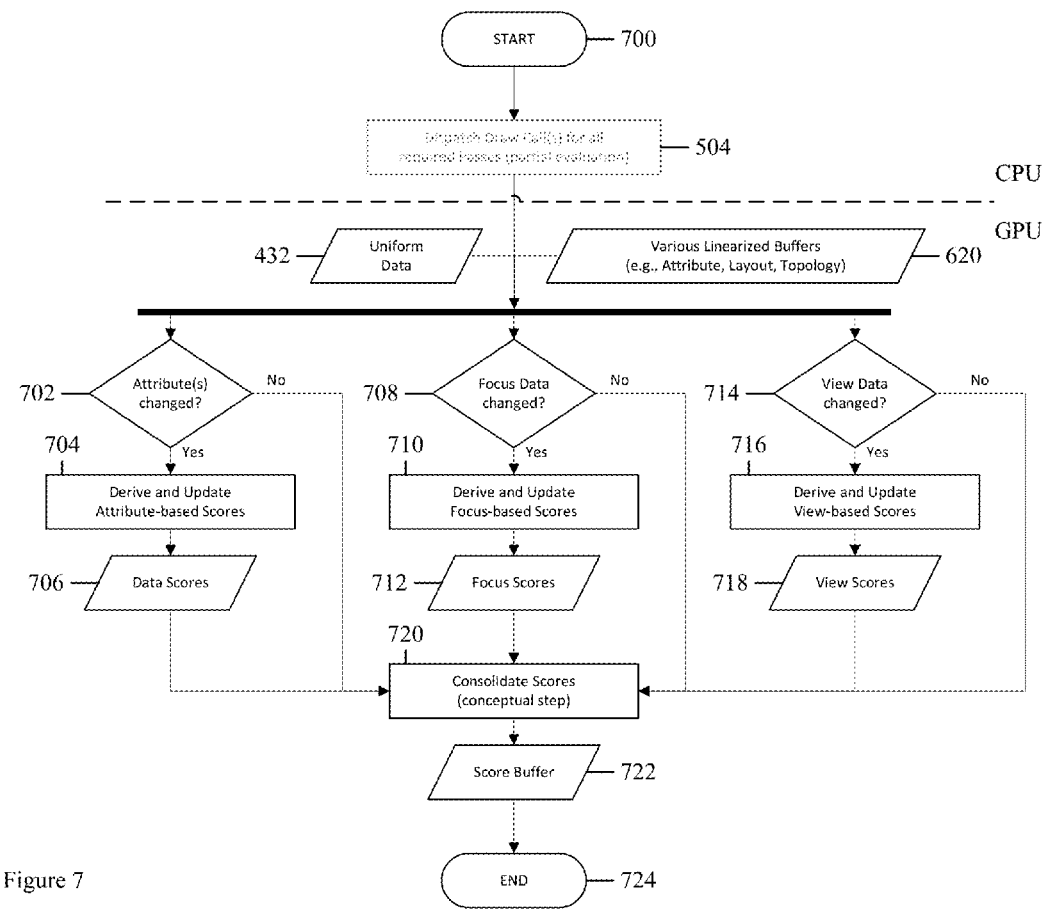
FIG. 7 illustrates scoring (bottom-up) that can be implemented in a lazy fashion (partial evaluation) whereby, if the underlying data used for specific scoring is unchanged, no recomputation is required.

FIG. 7 illustrates scoring (bottom-up) that can be implemented in a lazy fashion (partial evaluation) whereby, if the underlying data used for specific scoring is unchanged, no recomputation is required. Note that the consolidation of scores (720) is only a conceptual step. For an implementation an appropriate GPU-based buffer, e.g., with multiple channels (one per score) could be used. The final score is not explicitly stored but computed ad-hoc (FIG. 8) to reduce the memory footprint without compromising performance.

As shown in FIG. 7, the scoring is implemented in the rendering phase on the GPU in a lazy fashion. The GPU-based scoring for 2.5D treemaps begins at 700. Scoring is executed in parallel for each meta score (i.e., attribute-based, focus-based, and view scores). In the case of the attribute-based score, for example, it is determined at 702 whether the attribute(s) have changed after completion of the linearization stage of FIG. 6 at 624 or by means of changes in the uniform data 432. If the underlying data changed at 702, 708, or 714, for each node the score is derived and stored (704, 706; 710, 712; and 716, 718, respectively) in parallel, no traversal required, since the attributes are already accumulated. Alternatively, a single scoring pass can be used, reducing the tree traversal overhead. This has to be evaluated application specific, considering hardware constraints, frequency of user interactions and changes in scoring configurations, performance requirements, the types of scores used, and, finally, the number of attributes to be processed. Finally, in 720 all meta scores are consolidated into a single score buffer 722 (in the case of less or exactly 4 scores), storing one score per channel per node. It is important to note that at this point, no final, single score per node is derived yet and all individual meta scores can be access for arbitrary purposes in subsequent stages. The GPU-based scoring for 2.5D treemaps ends at 724. The process can be easily extended to account for additional meta scores not covered here.

For scoring, three different meta scores are introduced in FIG. 7: data/attribute, focus, and view scores. Attribute-based scoring (in contrast to FIG. 6) can also be done on the CPU since the data displayed and linearized in attribute buffers changes less often. If it changes, linearization and encoding is required, increasing CPU-GPU communication anyway. However, scoring on the GPU benefits when partial data updates or switching between attribute buffers, already in stock on the GPU, is desired. Focus-based scoring depends on user interaction, filtering, or changed mapping, and can be either on the GPU or on the CPU. Again, GPU-based execution should be preferred when focus scoring is intensively used (e.g., hovering, eye-tracking). Finally, view-based scoring correlates to screen size, view angle, zoom level, number of nodes, perspective, and more. Since most of these are under frequent change, a GPU-based implementation is usually preferred. All three meta scores, as a result of their subset of atomic scores, are stored per node in a linearized buffer (score buffer 722). Except for data (accessing accumulated data for inner nodes) and some view-based scores, scores are typically derived for all leaf nodes (single bucket). A final score for aggregation could be retrieved simultaneously, but this linear combination of three (or more) meta scores is usually retrieved within the aggregation pass directly.

With the score data available, rendering can proceed as illustrated in FIG. 10, which provides an example for a focus driven, dynamic LoD based user-focus scoring, i.e., mouse over, where (a) depicts nodes-of-interest as well as areas of recent user interaction that are non-aggregated, leaving all remaining nodes aggregated, and (b) depicts the user focus density map (for illustration purposes only) caused by the user's cursor movement.

FIG. 8 illustrates that, based on the scoring data, for every node (top-down) an aggregate state is derived in the aggregation pass, e.g., by evaluating the final, ad-hoc/in-place derived node-score that is passed to the subsequent pass. In addition, FIG. 8 illustrates a part of the algorithm used for temporal transition between two states using node-local durations. The node-local temporal transition is optional and is not required when, for example, only a single, static image (e.g., for print) is generated. Scores, aggregate decisions, and temporal transition states are persisted in memory whereby the traversing, identifying, mapping and rendering, and/or presenting steps are bypassed when input to the respective steps has not changed or temporal transition is not desired. It is also noted that the node-local transition states can be controlled by scores and/or attributes. The focus-scores then may be used to aggregate/de-aggregate nodes that are not in the focus more slowly and nodes-of-interest (within the focus) much faster or instantaneously. Note that the transitioning logic is designed for multiple frames and that the state buffer (816) is required to remember the current state when changing the targeted state and to initialize the node-local interpolation value t with zero.

As shown in FIG. 8, the GPU-based aggregation and rendering for 2.5D treemaps begins at 800 and performs a top-down aggregation pass at 806. Then, for each node (808), if another node is to process, the node's aggregation state is derived at 812. If the node's parent aggregation state is 'aggregate' or 'hide,' the node's aggregation state is set to 'hide' at step 814 and stored into the state buffer 816. Then, if the parent aggregation state is neither 'aggregate' nor 'hide,' the algorithm continues to step 818. If the node is a leaf, the aggregation state is set to 'default' (820). If not, the node's final score is derived at step 822 using specific uniform data 432 as well the previously derived meta scores, available via the score buffer 722. If, based on the final score, the inner node should aggregate (824), its state is set to 'aggregate' at step 826. Otherwise, its state is set to 'default' at step 820. In any case, after setting the state, control returns to step 808 to process the next node. Once all of the nodes have been processed, the algorithm ends at step 828.

Figure 9:
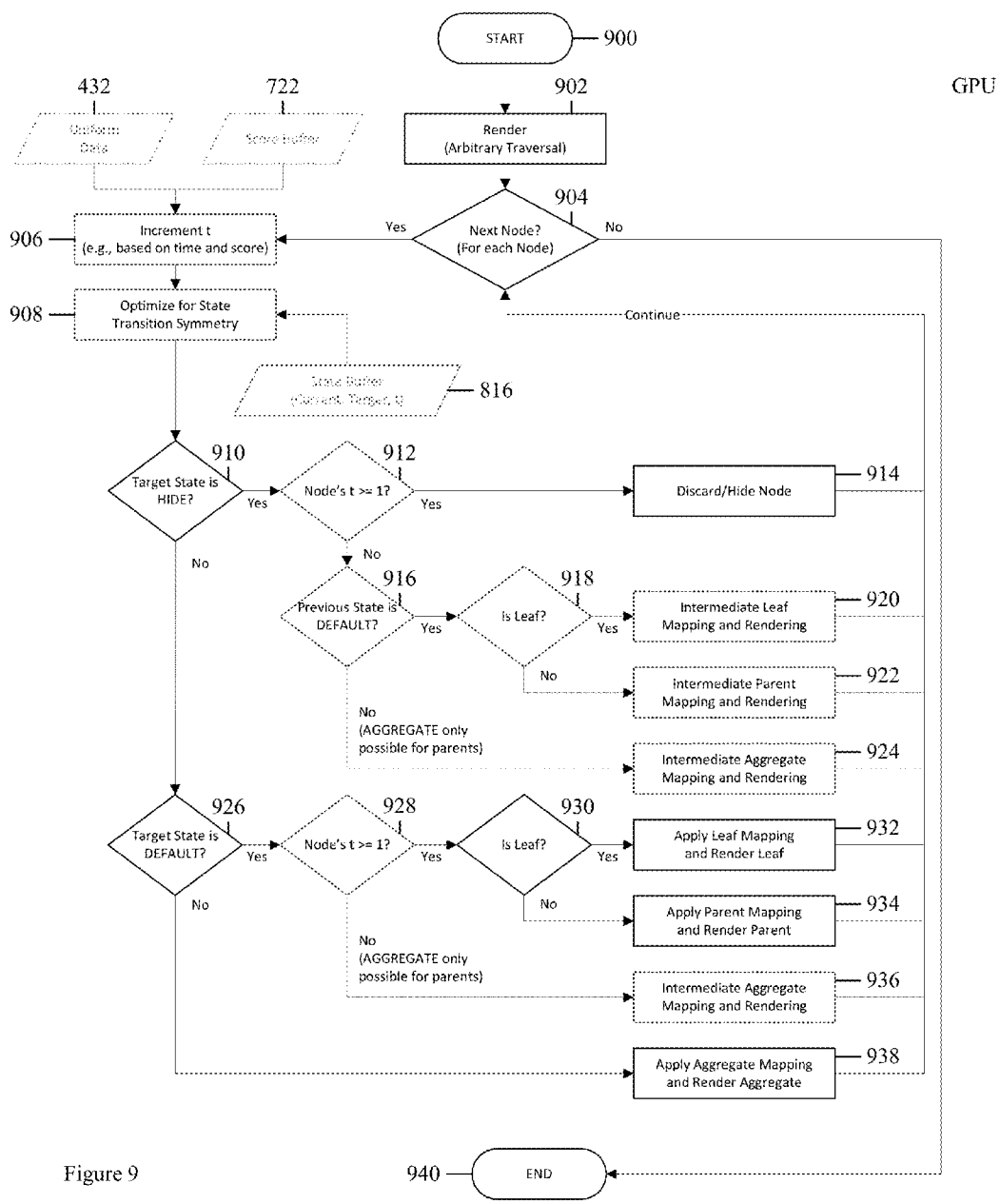
FIG. 9 illustrates the algorithm used to finally map the attributes to visual variables and render the treemap.

FIG. 9 illustrates the algorithm used to finally map the attributes to visual variables and render the treemap. With all aggregation states available, a rendering pass depicted in FIG. 9 starts at 900 using massive parallel processing (no specific traversal) to render using an arbitrary traversal at step 902. If there is another node to process at 904, it is determined at 910 if the node's state is 'hide.' If so, control continues to 914, discarding the node rendering completely. Otherwise, it is determined if the current node's state is set to 'default' (926) and, if not, aggregate mapping is applied and an aggregate rendering is executed (938). Otherwise, at 930, for leaf nodes, the default mapping and rendering process for leafs is executed (932). For inner nodes, the appropriate mapping and rendering is performed (934). Subsequent to any mapping and rendering process, control returns to 904 to process the next node. Once all nodes have been processed the algorithm ends at 940.

If temporal state transition is used, the algorithms for aggregation, mapping, and rendering, illustrated in FIGS. 8 and 9, are required to adapt the following optional processes (depicted via stippled lines in the respective figures). During aggregation, a preceding step 802 that accumulates data about whether or not a node is currently in transition. Therefore, an additional buffer 804 is used to store the binary information (binary mask). Furthermore, the state buffer 816 is extended. Instead of storing a single state, the current and the targeted states as well as the transitioning status by means of a linear transition value t∈[0; 1] are stored. If t equals 0, the current state is to be displayed. In the case t equals 1, the targeted, new state is to be displayed. Anything in between calls for an appropriate display of both states or an additional in-between state. If any processed node is masked to be in transition at 810, the node is not processed further and control continues to 808. While rendering, the temporal transitions duration is controlled by some node-local incrementation of t at step 906. Then, at step 908, the node's state data read from the state buffer can be transformed to simplify further processing, by benefiting from a symmetrical state transitioning concept, i.e., the subsequent algorithm is indifferent of the direction of state changes: 'hide' to 'default' is the same as 'default' to 'hide,' just the transition value t switches to 1−t. If t is greater than or equal to 1 (note: this also means t equals 0 due to symmetry) at step 912 as well as at step 928, the processes continue as before. If t<1 additional control is required. If the target state is 'hide' and the current/previous state is not 'default' at step 916, an intermediate aggregate is mapped and rendered (924). Otherwise, if the current/previous state is 'default' at step 916, either (918) mapping and rendering for an intermediate leaf (920) or intermediate inner node (922) is executed. Finally, if the targeted state is 'default' at step 926 and the node is in transition (928) mapping and rendering for intermediate aggregate display is performed (936).

Identification of Aggregates Using Node-Based Scoring

Using aggregation, topological overviews of large data sets can be created, that help users to recognize and remember patterns and correlations of a data set in its entirety (reference spatialization). The aggregation has to ensure that obvious, coarse features of a data set are not disguising less prominent but significant details conveyed by nodes-of-interest.

The level-of-detail determined by the degree of aggregation is interactively customizable on a global as well as local (per-node) basis. Globally, the aggregation might be omitted for nodes of a hierarchy level below or above a certain threshold. Locally, the virtual camera's view port and its distance to graphical-elements could provide dynamic LoD. A user may prefer to explore the treemap with locally adapting information density, e.g., by means of elaborated focus+context concepts such as lenses (TRAPP M., GLANDER T., BUCHHOLZ H., DÖLLNER J.: 3D Generalization Lenses for Interactive Focus+Context Visualization of Virtual City Models. In Proc. IEEE IV (2008), pp. 356-361). Hence, exemplary embodiments of the method further extend to a fine-grained parameterization by various constraints and are designed to operate on a per-frame and per-node basis. The methods permit adaptation to user interactions with noticeable/conscious as well as unobtrusive/unconscious consequences to the user, e.g., guiding the users focus-of-attention while decreasing information density of the visual display respectively.

In exemplary embodiments, for each node n, a set c of aggregation criteria c E c is defined by a score $s_c(n)$, which maps to the closed interval [−1, +1], striving either for or against aggregation with $s_c > 0$ or $s_c < 0$, respectively. The specific scores are then accumulated to a single node-score y using a weighted mean:

$$\gamma(n) = -\tau + (1-\tau)\frac{\sum_c \omega_c s_c(n)}{\sum_c \omega_c},$$

with $\omega_c$ for use-case specific weight settings and $\tau \in \{0,1\}$ enabling an aggregation override that is used for user specification of nodes-of-interest, i.e., selection and filtering. The aggregation in general is controlled by data attribute, attention/focus, and view based criteria. It will be appreciated that the accumulation may be accomplished by means of a use-case specific accumulation operator that can include retrieving an average, a minimum, a maximum, a mean, an average, an outlier, etc.

The scoring is applied during mapping and executed either on the CPU or the GPU in exemplary embodiments. The scoring can also be applied during filtering or data analysis if no feedback loop for the derivation of individual scores is required (e.g., static image is generated or user interaction is not required/provided and target platform is known).

For exemplary embodiments, this is the foundation for customizable aggregation implementations by means of adjusting individual scores with respect to the required visual display, the user interface, data characteristic, and the targeted use-case. The scoring and the linear combination of scores can be arbitrarily complex and the following two examples only present its most basic use. For example, focusing on reducing the complexity of the visual display on small devices (e.g., mobile provisioning of the visual display) by scoring the covered screen space of individual nodes and aggregates, that is, when a node or aggregate result in depiction at subpixel level or fall below a certain area threshold, its aggregation into parent nodes would be triggered. This allows decoupling of the complexity of the depicted software system information from the resulting complexity of the visual display, i.e., resolution of detail whereby regardless of the software systems size, the user is able to always grasp the characteristic of the software system as a whole, while still enabling detailed, fine grained display of context information by means of interactions (e.g., zoom, pan, rotate). Another example includes favoring software modules of frequent change over those with less frequent or no change via scoring. In combination with the screen space score this allows the system to guide the user to areas of interest with respect to, e.g., development activity. Nodes with frequent change would remain un-aggregated as long as they are not perishing in subpixel display. The remaining areas would remain aggregated as much as possible, up to a certain top-level threshold (also customizable via level scoring).

The following subsections describe the different types of scoring in more detail. The scoring is not limited to the individual scores listed below, but can account for any other score as well. Additionally, the method of the invention can easily incorporate existing concepts of, e.g., image-based masking and blending, from a technical perspective. Though, the configuration of use case specific, automated scoring becomes more difficult then.

Attribute-Based Scoring

Attribute-based scoring (704, FIG. 7) analyzes and assesses data attributes mapped to the nodes' visual variables and their characteristics. In contrast to interaction or view-based scoring approaches, it requires consideration of all leaf node attributes comprised by an inner node and is therefore processed bottom-up. Thereby, e.g., the variance or value range of inner nodes can be computed and applied to guide the user's focus-of-attention to areas-of-interest within the treemap. Inner nodes of high variance indicate an inhomogeneous distribution of attribute values among their child nodes and, therefore, might be scored for aggregation (variance score s,). Likewise, the number of children or absolute number of contained leaf nodes (not necessarily correlating to the nodes' footprint) can be used to emphasize similarly complex nodes (child count score) s,). Alternatively, the computation of local outliers on their siblings in a parent node is also possible using a local outlier factor.

Since attribute-based scoring depends on the depicted data only, it is required to be processed only if the data itself or its mapping to visual variables changes.

Focus-Based Scoring

Focus-based scoring (710, FIG. 7) is used to determine those areas of the treemap that are in the user's focus-of-attention. The aggregation of nodes within those areas can be omitted. Interaction-based scoring is required to support focus+context visualization. Among others, the following conscious and unconscious user interactions are considered for specifying an area-of-interest or node-of-interest:

look-at direction of the camera (spot score $s_{cam}$);
cursor position (mouse-over score $s_{mov}$);
gaze data (gaze score $s_{eye}$) provided by, e.g., eye-tracking.

Interaction history, captured in a temporal focus density map, is considered for focus-point specification. A density value is accumulated on a per-node basis. It increases or decreases over time, and the minimal distance between a block and the focus' center resides below or above a certain threshold (focus-of-attention score $s_{foa}$). For it, the focus density is updated whenever changes in any of the focus influencing criteria occur. For temporal focus density maps, the focus spreads not only to (1) adjacent nodes, but orthogonal to (2) its parent or child nodes. The former can be approximated by increasing the threshold. The latter is inherently resolved, since treemaps rely on spatial inclusion and thus satisfy the minimal distance criteria. The resulting score of a node is defined inversely proportional to its density, hindering nodes of recent user interaction to aggregate and thus providing coherent, recognizable areas-of-interest.

For example, FIG. 8 illustrates that, based on the scoring data, for every node (top-down) an aggregate state is derived in the aggregation pass. The subsequent mapping and rendering pass either renders an inner node as parent (not aggregated) or as aggregate. For the latter, the accumulated attribute data is mapped to the visual variables. Leaf nodes are rendered as always, as long as their parent is not flagged as aggregate (the aggregate information of an inner node is passed down to all children).

View-Based Scoring

The view-based scoring (716, FIG. 7), e.g., common to Level-of-Detail (LoD) techniques, scores based on the view frustum (region of space in the modeled world that may appear on the screen). By projecting the axis-aligned bounding box of a block into screen space, its screen-space area can be retrieved and matched against a minimal screen-space area. If the block of an inner node obtains insufficient screen space for the visual representation of its children or resides in sub-pixel space, at least for one major axis, it can be scored for aggregation (screen-space area score $s_{ssa}$). View-based scoring is mainly used to reduce visual clutter resulting from (1) leaf nodes depicted smaller than single screen pixels due to either perspective foreshortening or the pixels' limited footprint capacity, making a depiction of potentially important performance indicators for any inquiry pointless and (2) Moiré and other aliasing artifacts due to under sampling of both, the axis-aligned geometric nature of block boundaries, and their intentionally enclosing borders and spacing resulting from, e.g., edge-enhancement techniques.

View-based scoring is directly linked to user navigation and is computed implicitly. It allows for (1) a global LoD control that affects various criteria of the focus-based scoring (e.g., the minimal distance criteria) and (2) adaptive rendering performance control, adjusting the minimal screen-space criteria with respect to the mean frame duration or an entity budged (G1). In addition, occlusion queries could be used as LoD input: nodes that cause lots of occlusion might be aggregated if they are not as relevant (since usually some accumulation operator except maximum is used to derive the aggregates height and, thus, the occlusion is reduced), or, conversely, nodes whose children are mostly occluded could be aggregated.

Deduction of Color and Height of Aggregates

To satisfy the fidelity of (G5) of aggregates, a strict distinction between the mapped attributes (attribute space) and the used visual variables (presentation space) is desired. Therefore, the aggregation of data attributes is restricted to the attribute space and defined generally for arbitrary visual variables. For any depicted node, the color, for instance, is the result of a thematic color mapping. For a given data attribute, a normalized color look-up of a well-defined color scheme is performed, returning the mapped color. In contrast, aggregation of mapped colors of underlying nodes would build up a kind of "visual average", making a thematic interpretation impossible. Frequently, additional transformations of the normalized attributes precede the mapping to visual variables.

Given a univariate mapping restricting a visual variable to a single attribute, any multivariate mapping requires to be reduced to a univariate one. For any given node n, an attribute fetch for a visual variable $v \in$ (height, color ...) is given by $a_v(n)$ defined for all $n \in$ leaf(n). Thereby, leaf(n) denotes, the subset of leaf nodes within the children of n, or {n}, in the case where n is a leaf node itself. An extended attribute fetch $Y_v$ can now be defined for inner nodes as follows:

$$Y_v(n) = \begin{cases} a_v(n), \text{ if } n \in \text{leaf }(n) \\ \Xi_v(n), \text{ otherwise} \end{cases}.$$

$\Xi_v$ thereby denotes an attribute aggregation function that enables the integration of aggregation operators on all leaf nodes. Note that it is defined without the use of recursion. With that, an arithmetic mean operator for aggregation $\Xi_v^{\bar{n}}$ is defined as follows:

$$\Xi_v^{\bar{n}} |\text{leaf }(n)|^{-1} \sum_i a_v(n_i), \text{ with } n_i \in \text{leaf }(n).$$

The extended attribute fetch, though independent of the visual variables used, supports the application of arbitrarily specialized aggregation operators.

Since aggregation of information is always lossy, which aggregation to use depends on visualization goals and use cases. For example, aggregating the attributes mapped to the colors of child nodes (color attribute) using the mean attribute aggregation operator $\Xi_{color}^{\bar{n}}$, might be insufficient for a given task: interesting color attributes might cancel out each other or remain unnoticed because of their marginal share (e.g., due to a high number of children). Instead, attribute aggregation operators might favor attributes that deviate from the mean. For this purpose, the following weighted area and deviation based attribute aggregation operators is defined:

$$\Xi_v^A(n) = \frac{\sum_i A(n_i) a_v(n_i)}{\sum_i A(n_i)},$$

$$\Xi_v^{\sigma}(n) = \frac{\sum_i \sigma_v^e(n, n_i) a_v(n_i)}{\sum_i \sigma_v^e(n, n_i)},$$

with $n_i \in leaf(n)$, A denoting a node's base attribute, and $\sigma_\nu^e = (a_\nu(n_i) - \Xi_\mu^n(n))^e$ as a scalable deviation to the mean. In contrast to $\Xi_\nu^n$, $\Xi_\nu^A$ takes the treemap layout into account, favoring large footprints over small ones. For large treemaps, it is observed that, e.g., outlier of height or color attribute primarily reside in nodes of medium to small footprints. To account for this in the color aggregate, $\Xi_\nu^o$ provides an amplified deviation to the aggregates mean as color quantification. Ultimately, for aggregates occupying only a few pixels on screen, the maximum attribute could be selected as aggregated attribute (e.g., with e>>1).

Given the accumulated attribute information of inner nodes from the filtering stage, the deduction of color and height mapping for aggregates can be executed during mapping/rendering of the visualization pipeline. Exemplary implementations allow this either on the CPU in the mapping stage, preparing or updating the geometric description to be rendered or, alternatively, on the GPU. Since the exemplary implementation provides the hierarchy information and all leaf attributes on the GPU, the attribute accumulation (filtering), mapping, and rendering is completely executed and controlled on the GPU. This allows reduction of the per-frame CPU-GPU communication (especially for highly adaptive aggregation), further improving the visualization's rendering performance and dynamic for effective, interactive feedback loop with a user.

Discriminability of Aggregates

The aforementioned aggregation in presentation space denotes the introduction of additional visual variables used to distinguish aggregates from non-aggregates (G4): for aggregates, either truncated shapes or outlines similar to padding of visual representation of inner nodes are applied to satisfy discriminability of aggregates. Shape modifications and outlines can be also used in combination to further increase the discriminability of aggregates to non-aggregates if required.

Figures 11A, 11B, 11C:
FIG. 11a, FIG. 11b and FIG. 11c illustrate discriminability (G4) enhancing strategies for aggregates.

For example, FIG. 11 illustrates discriminability (G4) enhancing strategies for aggregates. FIG. 11(a) illustrates no enhancement, where aggregates cannot be distinguished from leaf nodes. FIG. 11(b) illustrates top face contouring and FIG. 11(c) illustrates top face truncation towards the center, both correlating to the aggregated node's padding.

All methods described above are executed within the rendering stage on the GPU for implementations of exemplary embodiments.

Rendering of Nodes-of-Interest within Aggregates

For aggregates that are constrained to satisfy, e.g., minimal visible extent, contained nodes-of-interest flagged for aggregation override can disappear. Rendering these nodes within aggregates by drawing both of their blocks simultaneously poses the following drawback: Abrupt crossovers between aggregates and contained node might be noticed as visual artifacts or result in misinterpretations of the hierarchy. To overcome this, rendering technique of the invention adds a spatial margin to nodes-of-interest, creating a gap within the aggregate that can be perceived due to lighting and shading discontinuities. This allows for visual preservation of both, the aggregates and the nodes-of-interest. It is noted that visualizing leafs or aggregates within aggregates for very important nodes (e.g., outlier or user-selected items) only works for 2.5D as there is no height in 2D and in 3D this is much more complicated (e.g., some kind of pinholes are required). Technically, the rendering takes advantage of stencil buffering+masking and the per-frame shape template instantiation, and is implemented in the following algorithm:

1. For every node-of-interest $L_i$, a transformed block $L_i'$ of the aggregate's height and marginally increased footprint is created. The inverted lateral surfaces of $L_i'$ are rendered and their top faces are added to a stencil mask.

2. For every remaining aggregate or leaf node, a block is created and its lateral surfaces are rendered. Simultaneously, the stencil mask is cleared for affected fragments.

3. The remaining blocks' top faces are rendered and stencil masked, and, finally, the blocks of every $L_i$ (bottom faces excluded) are rendered, stencil masking disabled.

Figures 12A, 12B, 12C:
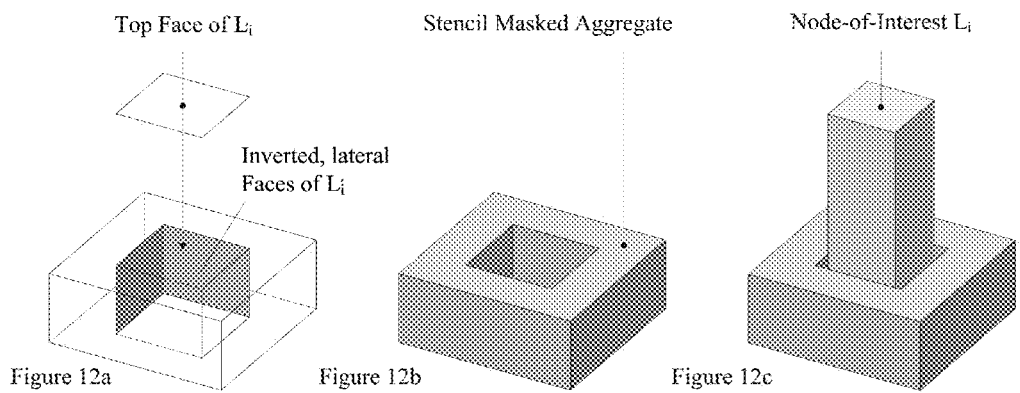
FIG. 12a, FIG. 12b, FIG. 12c and FIG. 12d illustrate the visual preservation of nodes-of-interest within aggregates where in FIG. 12a is the lateral surfaces of $L_i'$ are rasterized with inverted face orientation and the aggregate's color and, simultaneously, the top face of $L_i'$ is rasterized to a stencil mask, where in FIG. 12b is following that, default rasterization of all representing blocks including aggregates is executed, and where in FIG. 12c is $L_i$ is rasterized, with stencil masking disabled.
Figure 12D:
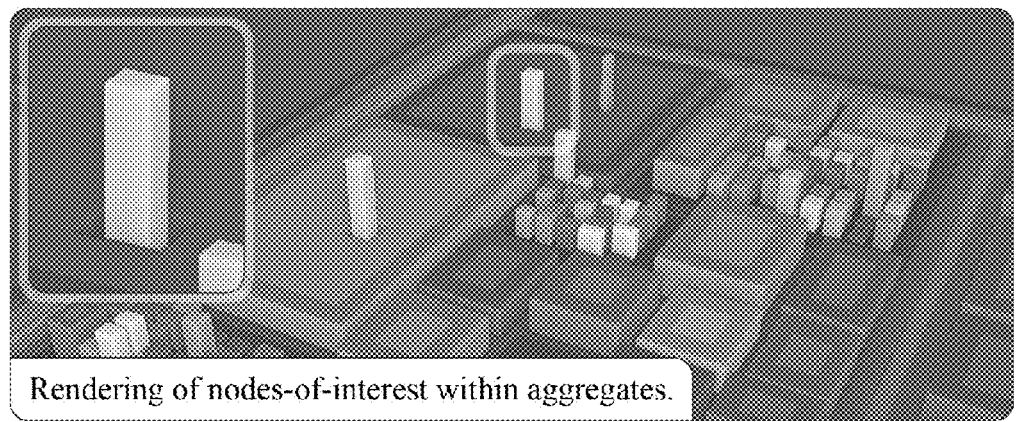

FIG. 12 illustrates preservation of nodes-of-interest within aggregates, where FIG. 12(a) illustrates that the lateral surfaces of $L_i'$ are rasterized with inverted face orientation and the aggregate's color. Simultaneously, the top face of $L_i'$ is rasterized to a stencil mask. FIG. 12(b) illustrates that, following that, default rasterization of all representing blocks including aggregates is executed. FIG. 12(c) illustrates that $L_i$ is rasterized, with stencil masking disabled. FIG. 12(d) depicts a basic, exemplary rendering of nodes-of-interest within aggregates using the disclosed algorithm. This method is used for the optional display of height-outliers as shown in the inset.

However, to avoid rendering artifacts, the algorithm should only be used if the parent node provides sufficient screen space area. When sufficient area is available, the outlier representation's base can be increased to remain visible, which in turn tampers with a user reading the base mapping. To avoid this, one may render an underlying aggregate instead of the leaf node itself using an appropriate aggregate operator on the color.

The described node-of-interest within aggregates algorithm is optionally executed during rendering, after all nodes and aggregates are rendered.

Embodiments

Within all embodiments, the methods and apparatus disclosed herein allow for more effective communication of and interaction with the relevant information, due to a reduction of the image data complexity for the visual display. Since the resulting depictions enable a varying local level-of-detail and level-of-abstraction they enable to guide an observer's attention towards regions-of-interest as well as individual nodes-of-interest within any displayed context. With it, the depicted information can be interactively and dynamically emphasized as well as attenuated based on its relevance at arbitrary (available) information resolution. Furthermore, the depictions can be visually adjusted for arbitrary image resolutions (based on the intended integration, e.g., small overview/thumbnail within a dashboard vs. exclusive display at max resolution), controlled by means of various user-interactions (e.g., eye tracking), and almost always improve rendering performance due to the decreased number of graphical elements that need to be processed for visual display.

Even though the methods and apparatus described herein are unaware of the visualized data's context and source, the following applications and their resulting use-cases represent preferred and exemplary areas of application.

Embodiment for Software Systems Engineering

In software systems engineering, massive amounts of software system information as well as process related information can be mined on a regular often real-time basis. In this context, the 2.5D treemaps are referred to as Software Maps.

The majority of today's software engineering processes rely on cloud-based, collaborative platforms (e.g., GitHub, Team Foundation Server). They produce increasing amounts of large, heterogeneous, distributed, and complex data, e.g., from development activity and source-code-based software metrics. Companies struggle with essential information gaps between management and development, which hinder informed decision making. Such gaps include clearly communicating quality standards (management to development), and, vice-versa, reasoning why a specific amount of resources is required for a given development task (resource allocation). Visualizing software system information using traditional plain lists and charts is hard because of the exploratory nature of the underlying questions and problems. It enforces an iterative refinement of and re-focusing within a massive amount of data.

Visual analysis and analytics provide effective means to explore and analyze data, applying methods, techniques, and tools that can be used to create visual communication artifacts automatically. They help bridge information gaps and provide additional up-to-date information, which jointly aid exploring code quality, estimating benefits, and decisions making.

Software Maps are applied for synthesis of communication artifacts that depict software system and software engineering information. They provide a hierarchy preserving layout and spatial context for code artifacts (code units) and metrics. Each graphical element represents a code unit (at varying abstraction levels) with visual variables that metrics can be mapped to. Incorporating them into engineering tool sets such as collaboration platforms, frameworks, or web-interfaces of source code repositories (1) reduces the heterogeneity of information processing and (2) facilitate effective communication, e.g., it supports stakeholders to efficiently gain insights, to uncover structures and patterns, as well as to acquire knowledge by reasoning. The use of Software Maps to monitor code quality and development activity is described by Bohnet and Döllner (BOHNET J., DÖLLNER J.: Monitoring Code Quality and Development Activity by Software Maps," ACM Proc. of the 2nd Workshop on Managing Technical Debt (2011), pp. 9-16).

Applications of Software Maps comprise but are not limited to monitoring and exploration of development/developer activity, source code changes, software quality, progress towards development goals/milestones, feature completeness, issue-tracking, resource allocation, software system architecture, maintenance activity, etc. The application is limited only by availability of data. Any data that can be referenced to the dependent variables (used as attributes of hierarchy elements) can be incorporated into the depiction. For example, in a recently presented list by A. Begel and T. Zimmermann, "Analyze this! 145 questions for data scientists in software engineering," in Proceedings of the 36th International Conference on Software Engineering (ICSE 2014). IEEE, 2014, of 145 top questions for data scientists in software engineering, the question: "How well does test coverage correspond to actual code usage by our customers?" is marked as one of the most essential questions for a software engineering process. This and similar types of correlation inquiries can be analyzed by software maps. Any metrics mapping may be assumed to be specified in an inquiry-benefiting manner, instrumenting data outliers or regions-of-interests due to prior data analysis as distinctive depiction of interesting aspects that in turn are forming starting points for further investigation and exploration.

With the presented methods and apparatus, the provisioning of software maps is simplified and the effectiveness of its visual display is increased. With the customizable scoring the software map can be optimized for specific map themes as well as for various usage and presentation scenarios, including, for example: individual exploration, focused inspection, or identification of known software modules, goals, or performances (e.g., what has changed, who has changed it, which of the changes were unexpected, etc.) in contrast to short pitches, development meetings, animated/video reports of a software's evolution (using scoring to guide user attention by aggregating less important nodes over time), and more.

Figures 13A, 13B, 13C:
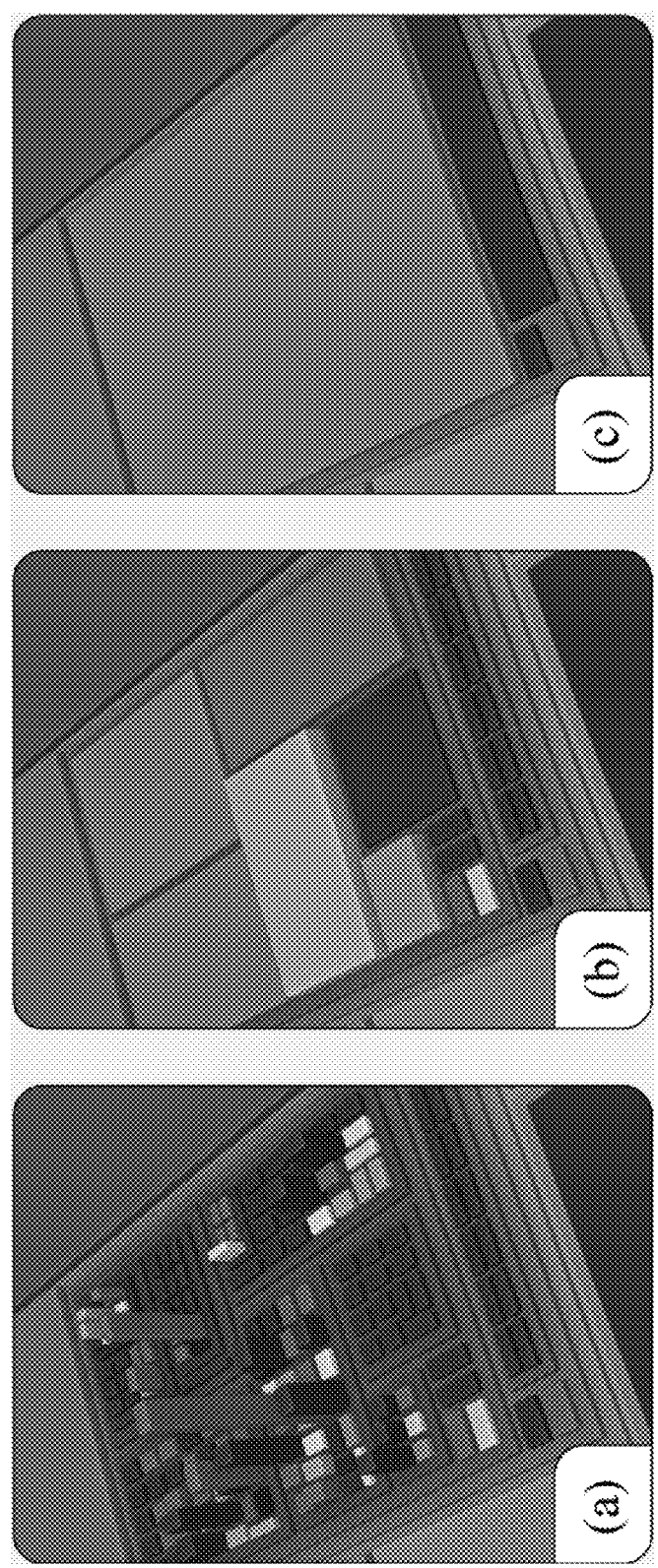
FIG. 13a, FIG. 13b and FIG. 13c illustrate that the aggregation of graphical elements is based on their inclusion using an aggregation operator (e.g., mean operator) for the depended attributes mapped to visual variables, i.e., height and color.

FIG. 13 illustrates that the aggregation of graphical elements is based on their inclusion, using an aggregation operator (e.g., mean operator) for the depended attributes mapped to visual variables, i.e., height and color. FIGS. 13(a) to (c) depict decreasing levels-of-detail for an area of a treemap. The applicable level-of-detail thereby ranges from non-aggregation, revealing all leaf nodes, to complete aggregation, accumulating the complete treemap into the node itself.

Figure 14:
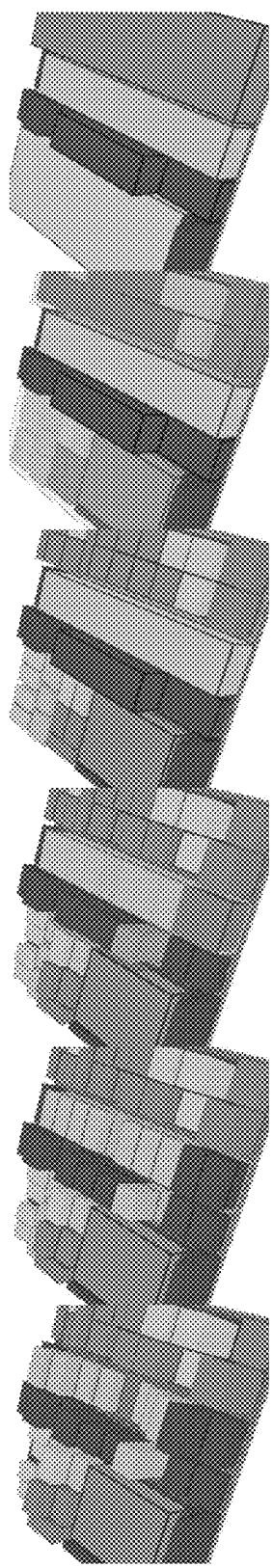
FIG. 14 illustrates a temporal transition for a very small set of nodes where from left to right snapshots from not aggregated to aggregated node states are depicted.

FIG. 14 illustrates a temporal transition for a very small set of nodes. From left to right snapshots from not aggregated to aggregated node states are depicted. The presented transitioning method is capable of using arbitrary transitioning effects (e.g., dissolve, fade) and allows for node-local durations, e.g., score controlled transition timing. Note that for explicit user defined aggregation (e.g., folding/unfolding using a point and click device that is accounted for by scoring as well) a fast or instant transition is preferred and slower temporal transitions are applied for automated, e.g., view-based scoring.

Alternative Embodiments

Business Intelligence Data

When making decisions based on massive amounts of real-time business data resulting from diverse resources (such as stock markets, software systems engineering processes, software or data repositories, trend forecasts, data mining services, watchdogs, etc.), 2D and 2.5D treemaps provide the means to visually capture that data and support informed decision making processes. In this context, 2.5D treemaps are referred to as BIMaps (Business Intelligence Maps).

In contrast to Software Maps, BI Maps are used as a holistic data overview with integral access to all data. For example, a user might start with a small set of the most relevant key performance indicators (KPIs) or "metrics" or "software metrics." The presented methods and apparatus are used to display these KPIs, custom grouped by the business structure or optimized with respect to CIO decision making process. In contrast to prior art systems, not only size, color, and height, but dynamic level-of-detail as well as the display of preserved underlying data characteristics are used to guide a user to the most critical, most relevant data while maintaining the context of all available data. Navigation by means of node-based scoring in real-time can then be used to reveal more and more details about the context and cause of the accumulated information. When presenting findings or reasoning about decisions with others, node-based scoring can further be configured, e.g., to guide the focus of attention to specific regions-of-interest or nodes-of-interest within the BI Maps. For more effective communication, this could be controlled and directed by any means of interaction, such as pointing devices or even real-time gaze evaluation of the speaker.

File System Exploration

A common use-case for the visualization of tree structured data is the depiction of file hierarchies for storage devices or virtual file systems. It can be used to effectively communicate and locate large parts/chunks/quota of memory. The accumulated information is usually already provided by the operating system, which allows the depiction of massive amounts of files within aggregated graphical elements. Thus, it allows guiding of an observer's attention to inquire relevant/interesting files and directories (paths). For example, a mapping theme with file size (or directory size in the case of accumulated attributes) mapped to base, the time passed since last file access mapped to a color, and the time passed since last modification inversely mapped to height. With each graphical element representing a file system path (file or directory) this exemplary mapping would allow more complex inquiries like "Where are large chunks of un-accessed data located?" or with an adjusted mapping theme "Which files are referenced in the file registry (e.g., on windows) and are currently accessed/opened?" to be answered more easily. In contrast to prior art and existing file exploration tools, applying the presented methods reduces the image data complexity by orders of magnitude as well as improves rendering performance while preserving the underlying data characteristics. Furthermore, the amount of interaction necessary for exploration and navigation can be reduced.

Figure 15A:
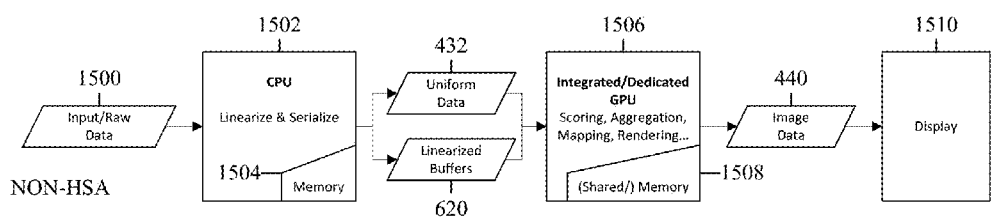
FIG. 15 illustrates two exemplary hardware arrangements for implementing the methods described herein targeting a CPU and a GPU.
Figure 15B:
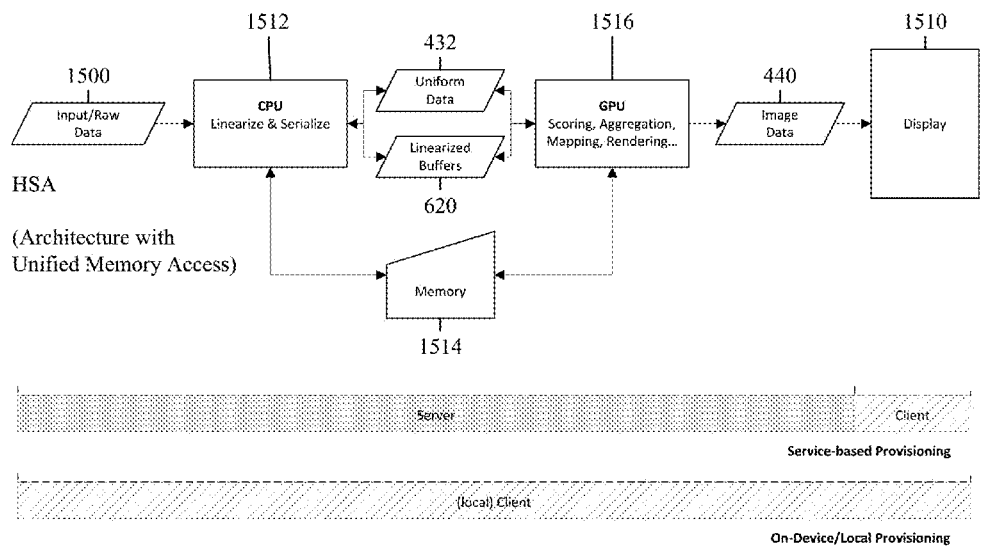

It will be appreciated that the methods described herein may be implemented in software that operates on a processor (e.g., CPU and/or GPU) that executes instructions stored in a memory component. FIG. 15 illustrates two exemplary hardware arrangement for implementing the methods described herein targeting a CPU and a GPU. The first arrangement (FIG. 15(a)) depicts the classical control and data flow between CPU and GPU, each having their own dedicated memory address space, i.e., data in CPU RAM cannot be accessed by the GPU. Therefore, every data required for GPU accelerated processing (e.g., for image synthesis) is required to be explicitly transferred and duplicated into GPU memory and vice versa. This comprises one of the main bottlenecks by means of processing speed and control flow design. The second arrangement (FIG. 15(b)) depicts a near-future architecture, a heterogeneous system architecture (HSA) using the same memory address space (unified memory access) for storage and, with that, communication of CPU and GPU. This architecture would allow processing to execute on the CPU and GPU in parallel, accessing the same memory (no transfer and duplication required). This affects system and control flow design especially for GPU accelerated methods.

More particularly, in FIG. 15(a), service-based provisioning versus 'on-device' provisioning is indicated. For the service-based provisioning, e.g., a thin client can be assumed for displaying the image data. As illustrated, the methods are implemented using a CPU 1502 that preprocesses the input data 1500 as described herein by means of linearization and serialization. The GPU 1506 scores, aggregates, maps, and renders the data stored in the linearized buffers 620 configured via uniform data 432 to synthesize image data to be provisioned as image data 440 to a display 1510 as described herein. Therefore, these data need to be copied to the GPU memory 1508 to be accessible for image synthesis. As a result, the data 432 and 620 is often stored on both, CPU and GPU memory (1504 and 1508). The processors 1502 and 1506 may include a standardized processor, a specialized processor, a microprocessor, or the like. The processors 1502 and 1506 may execute instructions including, for example, instructions for implementing the method as described herein. On the other hand, the memory components 1504, 1508 store the instructions that may be executed by the processors 1502 and 1506. These dedicated memory components may include a tangible computer readable storage medium in the form of volatile and/or nonvolatile memory such as random access memory (RAM), read only memory (ROM), cache, flash memory, a hard disk, or any other suitable storage component.

On the other hand, for the HSA (Heterogeneous System Architecture) arrangement shown in FIG. 15(b), the input data in 1500 is again preprocessed in by the CPU 1512, this time, with the resulting linearized buffer and uniform data stored in the unified memory address space 1514 is directly accessible by the GPU 1516. Copying, transferring, or duplicating data is not required and benefits the design of the disclosed methods and system. In addition, all previously GPU-bound buffers (e.g., score buffer 722, 'InTransition' mask buffer 804) are accessible by the CPU 1512, enabling bidirectional communication of CPU and GPU for intermixed execution (either on CPU or GPU) of the steps herein described, e.g., based on system specific constraints and performance evaluation.

The disclosed methods are optimized for various underlying memory architectures and with it, subsequent communication between CPU and GPU. This includes arrangements using dedicated as well as integrated GPUs (with shared memory, that is, conceptual GPU specific memory). Furthermore, the disclosed methods and system are especially designed for future architectures using unified memory access. In the case of unified memory access, the CPU and GPU can access the same data which might enable any massive parallel processing to be performed via the GPU. In one embodiment, the memory component may be a separate component in communication with a processor, while in another embodiment, the memory component may be integrated into the processor. Such non-transitory memory components may be used as a computer readable storage device to store the instructions for implementing the methods and software features described herein.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

What is claimed:

1. A method of visualizing tree-structured data on a display using an aggregation approach that allows for a dynamic, interactive, adaptive level-of-detail for 2D, 2.5D, and/or 3D treemaps, including:
   receiving layed-out tree-structured data including encoded node positions and extents;
   traversing dependent attributes to accumulate attributes using a use-case specific accumulation operator in the tree-structured data;
   identifying aggregates by interactive scoring of each node in the tree-structured data based on contextual relevance and other criteria including at least one of changes in attributes, focus, or view of the tree-structured data based on task, interaction, visibility, processing budget, and/or performance specific criteria;
   mapping and rendering the identified aggregates as a per-frame aggregation of blocks and accumulation of attributes mapped to visual variables; and presenting the aggregated blocks to a display while visually preserving important data conveyed by tree-structured elements and their mapped attributes based on a specified mapping theme for the tree-structured data.

2. The method of claim 1, wherein important data preserved in the presenting step includes aggregated color and height data, aggregates that are discernible from non-aggregates, and outliers within aggregates.

3. The method of claim 2, wherein the mapping and rendering the identified aggregates further comprises rendering height outliers.

4. The method of claim 1, wherein identifying aggregates comprises: for an input set of attributes, retrieving a set of associated nodes in the tree-structured data and using the set of associated nodes as a baseline for bottom-up aggregation of all remaining nodes in the tree-structured data.

5. The method of claim 4, wherein for aggregated nodes, mapped attributes are accumulated to create aggregated cuboids with additional visual fidelity that allows preservation of important attributes while reducing the geometric complexity of the tree-structured data.

6. The method of claim 4, wherein a set of child nodes of an inner node in the tree-structured data is generalized as a single graphical element that extends a block of the inner node with respect to the tree-structured data's attribute mapping by the visual variables used in the mapping and rendering step, whereby the inner node is represented as a leaf node to display additional data on the display.

7. The method of claim 1, wherein the tree-structured data is optimized for tree traversal and massive parallel processing per level by sorting inner nodes with a same hierarchy level into a same grouping.

8. The method of claim 1, wherein the tree-structured data comprises software system data as well as process related data.

9. The method of claim 1, wherein the tree-structured data comprises business intelligence data.

10. The method of claim 1, wherein the tree-structured data comprises file hierarchies for storage devices or virtual file systems.

11. The method of claim 1, wherein identifying aggregates includes dynamic scoring of each node and dynamic aggregation of the scored nodes, and the mapping and rendering the identified aggregates includes mapping and rendering the dynamically aggregated scored nodes.

12. The method of claim 1, wherein accumulation operators per attribute or attribute group of the tree-structured data are specified and used for bottom-up accumulation per attribute in the tree-structured data.

13. The method of claim 1, wherein scoring of each node is executed and accumulated in parallel for attribute-based, focus-based, and view-based scores.

14. The method of claim 13, wherein the attribute-based, focus-based, and view-based scores are consolidated into a single score.

15. The method of claim 1, wherein the attributes are mapped to visual variables including at least one of height, color, transparency, shading, shape, and weight in the mapping and rendering step.

16. The method of claim 1, wherein scores, aggregate decisions, and temporal transition states are persisted in memory whereby said traversing, identifying, mapping and rendering, and/or presenting steps are bypassed when input to the respective steps has not changed or temporal transition is not desired.

17. The method of claim 1, wherein a temporal state transition method is implemented whereby during the step of identifying aggregates data is accumulated about whether or not a node is currently in transition and the current and targeted states are stored as well as the transitioning status my means of a linear transition value per node.

18. The method of claim 17, wherein node-local transition states are controlled by scores and/or attributes.

19. The method of claim 1, further comprising optimizing the tree-structured data for storage in a unified memory architecture for shared access by a CPU and a GPU using unified memory access.

20. A system for visualizing tree-structured data on a display using an aggregation approach that allows for a dynamic, interactive, adaptive level-of-detail for 2D, 2.5D, and/or 3D treemaps, comprising:
a central processing unit executing instructions that when executed by the central processing unit cause the central processing unit to perform the steps of:
receiving layed-out tree-structured data including encoded node positions and extents;
traversing dependent attributes to accumulate attributes using a use-case specific accumulation operator in the tree-structured data; and
providing the accumulated attributes as output; and
a graphics processing unit executing instructions that when executed by the graphics processing unit cause the graphics processing unit to perform the steps of:
identifying aggregates by interactive scoring of each node in the tree-structured data based on contextual relevance and other criteria including at least one of changes in attributes, focus, or view of the tree-structured data based on task, interaction, visibility, processing budget, and/or performance specific criteria;
mapping and rendering the identified aggregates as a per-frame aggregation of blocks and accumulation of attributes mapped to visual variables; and
presenting the aggregated blocks to the display while visually preserving important data conveyed by tree-structured elements and their mapped attributes based on a specified mapping theme for the tree-structured data.

21. The system of claim 20, wherein the visually preserved important data includes aggregated color and height data, aggregates that are discernible from non-aggregates, and outliers within aggregates.

22. The system of claim 21, wherein mapping and rendering the identified aggregates by the graphics processing unit further comprises rendering height outliers.

23. The system of claim 20, wherein identifying aggregates by the graphics processing unit comprises:
for an input set of attributes, retrieving a set of associated nodes in the tree-structured data and using the set of associated nodes as a baseline for bottom-up aggregation of all remaining nodes in the tree-structured data.

24. The system of claim 23, wherein for aggregated nodes, mapped attributes are accumulated by the graphics processing unit to create aggregated cuboids with additional visual fidelity that allows preservation of important attributes while reducing the geometric complexity of the tree-structured data.

25. The system of claim 23, wherein a set of child nodes of an inner node in the tree-structured data is generalized by the graphics processing unit as a single graphical element that extends a block of the inner node with respect to the tree-structured data's attribute mapping by the visual variables used in the mapping and rendering step, whereby the inner node is represented as a leaf node to display additional data on the display.

26. The system of claim 20, wherein the tree-structured data is optimized by the central processing unit for tree traversal and massive parallel processing per level by sorting inner nodes with a same hierarchy level into a same grouping.

27. The system of claim 20, wherein the tree-structured data comprises software system data as well as process related data.

28. The system of claim 20, wherein the tree-structured data comprises business intelligence data.

29. The system of claim 20, wherein the tree-structured data comprises file hierarchies for storage devices or virtual file systems.

30. The system of claim 20, wherein identifying aggregates by the graphics processing unit includes dynamic scoring of each node and dynamic aggregation of the scored nodes, and the mapping and rendering the identified aggregates by the graphics processing unit includes mapping and rendering the dynamically aggregated scored nodes.

31. The system of claim 20, wherein accumulation operators per attribute or attribute group of the tree-structured data are specified by the central processing unit and used for bottom-up accumulation per attribute in the tree-structured data.

32. The system of claim 20, wherein scoring of each node is executed and accumulated in parallel by the graphics processing unit for attribute-based, focus-based, and view-based scores.

33. The system of claim 32, wherein the attribute-based, focus-based, and view-based scores are consolidated into a single score by the graphics processing unit.

34. The system of claim 20, wherein the attributes are mapped by the graphics processing unit to visual variables including at least one of height, color, transparency, shading, shape, and weight in the mapping and rendering step.

35. The system of claim 20, wherein scores, aggregate decisions, and temporal transition states are persisted in memory whereby said traversing, identifying, mapping and rendering, and/or presenting steps of the graphics processing unit are bypassed when input to the respective steps has not changed or temporal transition is not desired.

36. The system of claim 20, wherein a temporal state transition method is implemented in said graphics processing unit whereby during the step of identifying aggregates data is accumulated about whether or not a node is currently in transition and the current and targeted states are stored as well as the transitioning status my means of a linear transition value per node.

37. The system of claim 36, wherein node-local transition states are controlled by scores and/or attributes by said graphics processing unit.

38. The system of claim 20, further comprising the central processing unit optimizing the tree-structured data for storage in a unified memory architecture for shared access by the central processing unit and the graphics processing unit using unified memory access.

* * * * *